(12) United States Patent
Choi et al.

(10) Patent No.: US 12,444,461 B2
(45) Date of Patent: Oct. 14, 2025

(54) SRAM INCLUDING REFERENCE VOLTAGE GENERATOR AND READ METHOD THEREOF

(71) Applicant: SAMSUNG ELECTRONICS CO., LTD., Suwon-si (KR)

(72) Inventors: Kyuwon Choi, Suwon-si (KR); Chanho Lee, Suwon-si (KR); Hyeongcheol Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 18/347,852

(22) Filed: Jul. 6, 2023

(65) Prior Publication Data
US 2024/0071479 A1    Feb. 29, 2024

(30) Foreign Application Priority Data
Aug. 30, 2022    (KR) .................. 10-2022-0109484

(51) Int. Cl.
| | | |
|---|---|---|
| *G11C 11/40* | (2006.01) | |
| *G11C 11/4091* | (2006.01) | |
| *G11C 11/4094* | (2006.01) | |
| *G11C 11/4099* | (2006.01) | |

(52) U.S. Cl.
CPC ...... *G11C 11/4099* (2013.01); *G11C 11/4091* (2013.01); *G11C 11/4094* (2013.01)

(58) Field of Classification Search
CPC ............ G11C 11/4099; G11C 11/4091; G11C 11/4094; G11C 29/021; G11C 29/028; G11C 7/065; G11C 5/147; G11C 7/12; G11C 11/419; G11C 11/417; G11C 11/413
See application file for complete search history.

(56) References Cited

U.S. PATENT DOCUMENTS

| | | | |
|---|---|---|---|
| 7,768,321 B2 | 8/2010 | Chang et al. | |
| 8,638,627 B2 | 1/2014 | Koo | |
| 9,564,235 B2 | 2/2017 | Zhou et al. | |
| 9,754,641 B1 * | 9/2017 | Reaves | ..................... G11C 7/14 |
| 11,086,349 B2 | 8/2021 | Peng et al. | |

(Continued)

FOREIGN PATENT DOCUMENTS

| | | |
|---|---|---|
| CN | 114153497 | 3/2022 |
| KR | 10-0607343 | 7/2006 |
| KR | 10-2012-0096294 | 8/2012 |

(Continued)

*Primary Examiner* — Xiaochun L Chen
(74) *Attorney, Agent, or Firm* — Morgan, Lewis & Bockius LLP

(57) ABSTRACT

A static random access memory includes a memory cell that stores data, a reference voltage generator that generates a reference voltage, a precharge circuit that is connected with the memory cell through a bit line, is connected with the reference voltage generator through a reference bit line, and pre-charges the bit line and the reference bit line, and a sense amplifier that is connected with the bit line and the reference bit line, compares a voltage of the bit line and a voltage of the reference bit line to generate a comparison result, and determines a value of the data stored in the memory cell based on the comparison result. The reference voltage generator includes first-type transistors.

20 Claims, 16 Drawing Sheets

(56) References Cited

U.S. PATENT DOCUMENTS

2015/0063007 A1\*  3/2015  Choi .................... G11C 11/419
                                                        365/154
2016/0180894 A1\*  6/2016  Huang .................... G11C 7/08
                                                        365/189.09

FOREIGN PATENT DOCUMENTS

| KR | 10-2017-0036163 | 4/2017 |
| KR | 10-1732238 | 4/2017 |

\* cited by examiner

| | Case 1 | Case 2 | Case 3 |
|---|---|---|---|
| Driving ability of PMOS | 10(Target) | 8(Slow) | 12(Fast) |
| Driving ability of NMOS | 5(Target) | 7(Fast) | 3(Slow) |
| Vout | Target Vout | Smaller than target voltage | Larger than target voltage | ns
SRAM INCLUDING REFERENCE VOLTAGE GENERATOR AND READ METHOD THEREOF

CROSS-REFERENCE TO RELATED APPLICATIONS

This U.S. non-provisional patent application claims priority under 35 U.S.C. § 119 to Korean Patent Application No. 10-2022-0109484 filed on Aug. 30, 2022, in the Korean Intellectual Property Office, the disclosure of which is incorporated by reference in its entirety herein.

1. TECHNICAL FIELD

Embodiments of the present disclosure described herein relate to a semiconductor device, and more particularly, relate to a static random access memory (SRAM) including a single bit line and performing a read operation by using a reference voltage.

2. DISCUSSION OF RELATED ART

A static random access memory (SRAM) may be classified as a single bit line-type SRAM or a double bit line-type SRAM depending on a structure of a memory cell. The single bit line-type SRAM includes one bit line through which a voltage is output from a memory cell and includes a reference voltage generator that generates a separate reference voltage. The double bit line-type SRAM includes a bit line and a complementary bit line through which voltages are output from a memory cell.

The SRAM may use a sense amplifier for comparing voltages. For example, a differential-type sense amplifier may be used to determine data stored in a single bit line-type SRAM cell. That is, the sense amplifier may determine a value of data stored in a memory cell by comparing a voltage of a bit line connected with the memory cell with a voltage of a reference bit line connected with a reference voltage generator.

Since the differential-type sense amplifier operates stably even with a small input voltage difference, it may be used in a high-performance SRAM. However, it is very difficult to generate a stable reference voltage having a narrow distribution width due, which is needed for a differential-type sense amplifier.

SUMMARY

Embodiments of the present disclosure provide a reference voltage generator for generating a stable reference voltage in an SRAM including a single bit line.

According to an embodiment, a static random access memory includes a memory cell that stores data, a reference voltage generator that generates a reference voltage, a pre-charge circuit that is connected with the memory cell through a bit line, is connected with the reference voltage generator through a reference bit line, and pre-charges the bit line and the reference bit line, and a sense amplifier that is connected with the bit line and the reference bit line, compares a voltage of the bit line and a voltage of the reference bit line, and determines a value of the data stored in the memory cell based on the compare. The reference voltage generator includes first-type transistors.

According to an embodiment, a static random access memory includes a memory cell that stores data, a reference voltage generator that generates a reference voltage, a pre-charge circuit that is connected with the memory cell through a bit line, is connected with the reference voltage generator through a reference bit line, and pre-charges the bit line and the reference bit line, and a sense amplifier that is connected with the bit line and the reference bit line, compares a voltage of the bit line and a voltage of the reference bit line, and determines a value of the data stored in the memory cell based on a result of the compare. The reference voltage generator includes a first PMOS transistor that is connected between a terminal providing a power supply voltage and a first node from which the reference voltage is output and operates in response to a first voltage, a second PMOS transistor that is connected between the first node and a second node and operates in response to a reference voltage enable signal, and at least one NMOS transistors that are connected between the second node and a terminal providing a ground voltage and operate in response to a second voltage.

According to an embodiment, a static random access memory includes a memory cell that stores data, a reference voltage generator that generates a reference voltage, a pre-charge circuit that is connected with the memory cell through a bit line, is connected with the reference voltage generator through a reference bit line, and pre-charges the bit line and the reference bit line, and a sense amplifier that is connected with the bit line and the reference bit line, compares a voltage of the bit line and a voltage of the reference bit line, and determines a value of the data stored in the memory cell based on as result of the compare. The reference voltage generator includes a first PMOS transistor that is connected between a terminal providing a power supply voltage and a first node from which the reference voltage is output and operates in response to a first voltage, a second PMOS transistor that is connected between the first node and a second node and operates in response to a reference voltage enable signal, at least one third PMOS transistor connected between the second node and a terminal providing a ground voltage and configured to operate in response to the first voltage, and at least one first NMOS transistor connected between the second node and the terminal providing the ground voltage and configured to operate in response to a second voltage.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art may implement the invention.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
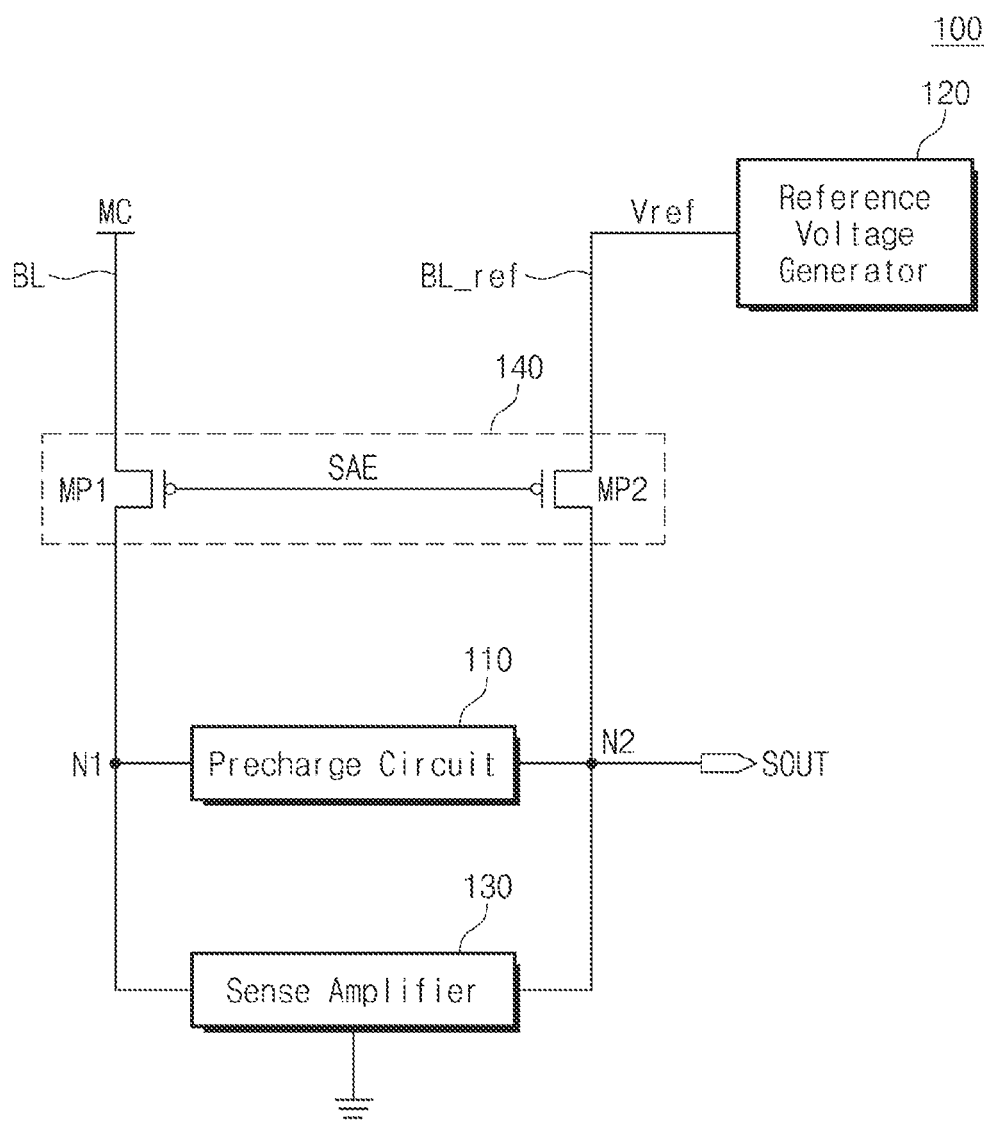
FIG. 1 is a block diagram of an SRAM according to an embodiment of the present disclosure.

FIG. 1 is a block diagram of an SRAM according to an embodiment of the present disclosure.

An SRAM 100 may include a precharge circuit 110, a reference voltage generator 120, a sense amplifier 130, a switching circuit 140, and a memory cell MC.

The memory cell MC may be an SRAM cell that includes one or more p-channel metal-oxide semiconductor (PMOS) transistors and one or more n-channel metal-oxide semiconductor (NMOS) transistors. The memory cell MC may be an SRAM cell including a single bit line. That is, unlike an SRAM that has a double bit line structure and determines data by sensing a difference of signals output from two bit lines, data are determined based on a signal output from the memory cell MC through one bit line BL.

The memory cell MC may include two inverters for latching data and a transfer gate transistor connecting the bit line BL with a latch of the memory cell MC. Embodiments of the present disclosure may be applied to an SRAM that outputs data stored in a memory cell through one bit line regardless of the configuration of the memory cells.

The precharge circuit 110 may pre-charge the bit line BL and a reference bit line BL_ref or may equalize the bit line BL and the reference bit line BL_ref with the same voltage. The precharge circuit 110 may include a PMOS transistor and/or NMOS transistors, and may transfer a voltage (e.g., a power supply voltage) provided from the outside to the bit line BL and the reference bit line BL_ref.

The reference voltage generator 120 may generate a reference voltage Vref that is used to determine data stored in the memory cell MC. The reference voltage Vref may be output through the reference bit line BL_ref. In the case of determining data stored in the memory cell MC, when a level of a voltage output through the bit line BL is higher than a level of a voltage output through the reference bit line BL_ref, it may be determined that the memory cell MC stores data of a first value (i.e., "0" or "1"). In contrast, when a level of a voltage output through the bit line BL is lower than a level of a voltage output through the reference bit line BL_ref, it may be determined that the memory cell MC stores data of a second value (i.e., "1" or "0") that is different from the first value.

The reference voltage generator 120 may be configured to generate the reference voltage Vref of a uniform level. For example, the reference voltage generator 120 may include a voltage divider, and the voltage divider may be composed of a plurality of transistors. In an embodiment, the plurality of transistors constituting the reference voltage generator 120 may be implemented with a first-type transistor (e.g., a PMOS transistor). In another embodiment, the plurality of transistors constituting the reference voltage generator 120 may be implemented with a second-type transistor (e.g., an NMOS transistor). In another embodiment, the plurality of transistors constituting the reference voltage generator 120 may be implemented with a combination of the first-type transistor and the second-type transistor. A configuration and an operation of the reference voltage generator 120 will be described in detail later.

The sense amplifier 130 may sense data stored in the memory cell MC by sensing a voltage difference of the bit line BL and the reference bit line BL_ref. In an embodiment, the sense amplifier 130 is a differential-type sense amplifier. The sense amplifier 130 may output a sensing result as a signal SOUT. The sense amplifier 130 may include PMOS transistors and NMOS transistors.

In response to a sense amplifier enable signal SAE, the switching circuit 140 may connect the memory cell MC with the precharge circuit 110 and the sense amplifier 130 or may disconnect the memory cell MC from the precharge circuit 110 and the sense amplifier 130. In response to the sense amplifier enable signal SAE, the switching circuit 140 may connect the reference voltage generator 120 with the precharge circuit 110 and the sense amplifier 130 or may disconnect the reference voltage generator 120 from the precharge circuit 110 and the sense amplifier 130.

In an embodiment, the switching circuit 140 may include a PMOS transistor MP1 for transferring the signal output from the memory cell MC through the bit line BL to the sense amplifier 130. The transistor MP1 may be connected between the memory cell MC and a node N1. The switching circuit 140 may further include a PMOS transistor MP2 for transferring the signal (i.e., Vref) output from the reference voltage generator 120 through the reference bit line BL_ref to the sense amplifier 130. The transistor MP2 may be connected between the reference voltage generator 120 and a node N2. For example, the transistors MP1 and MP2 may be referred to as "switching transistors".

However, the configuration of the switching circuit 140 is not limited thereto. For example, the switching circuit 140 may further include various components for transferring the signal output from the memory cell MC and the reference voltage Vref to the sense amplifier 130.

Figure 2:
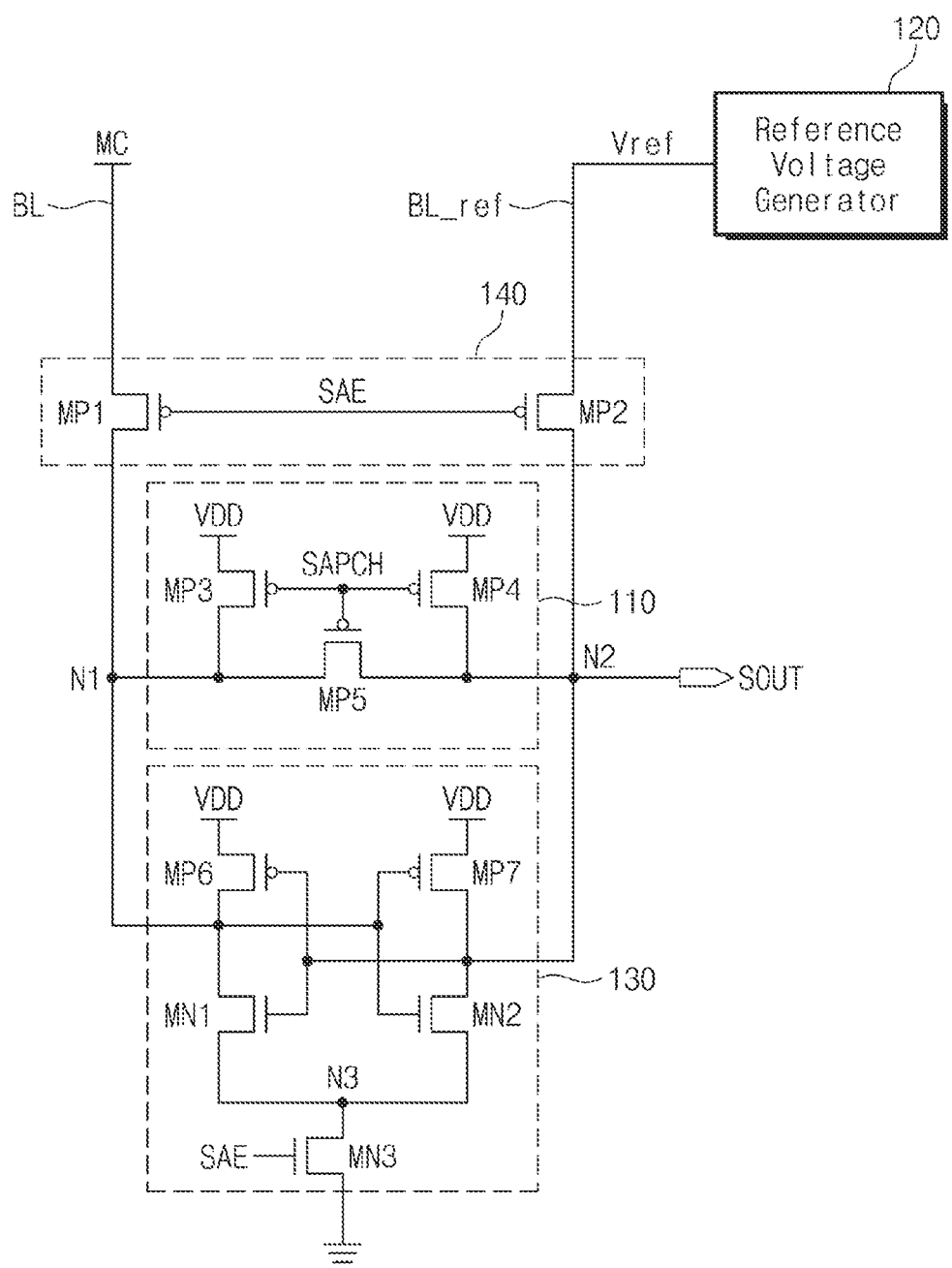
FIG. 2 is a circuit diagram illustrating a configuration of an SRAM of FIG. 1.

FIG. 2 is a circuit diagram illustrating a configuration of an SRAM of FIG. 1.

The precharge circuit 110 may include transistors MP3, MP4 and MP5. The transistor MP3 may be connected between the node N1 and a terminal supplying a power supply voltage VDD. The transistor MP4 may be connected between the node N2 and the terminal supplying the power supply voltage VDD. The transistor MP5 may be connected between the node N1 and the node N2. In response to a sense amplifier precharge signal SAPCH, the transistors MP3, MP4, and MP5 may pre-charge or equalize the nodes N1 and N2. In an embodiment, gates of the transistors MP3, MP4 and MP5 are connected to one another and receive the sense amplifier precharge signal SAPCH.

The sense amplifier 130 may be configured to sense a voltage difference of the bit line BL and the reference bit line BL_ref. In an embodiment, the sense amplifier 130 is a latch-type sense amplifier. In an embodiment, the sense amplifier 130 includes a first inverter (or a first latch) composed of transistors MP6 and MN1 and a second inverter (or a second latch) composed of transistors MP7 and MN2. An input terminal of the first inverter (or the first latch) and an output terminal of the second inverter (or the second latch) may be connected with each other, and an output terminal of the first inverter (or the first latch) and an input terminal of the second inverter (or the second latch) may be connected with each other. The output terminal of the first inverter (or first latch) and the input terminal of the second inverter (or the second latch) may be connected with the node N1, and the output terminal of the second inverter (or the second latch) and the input terminal of the first inverter (or the first latch) may be connected with the node N2. In an embodiment, source terminals of the transistors MN1 and MN2 are connected with a node N3.

A transistor MN3 may operate in response to the sense amplifier enable signal SAE. For example, the transistor MN3 may be turned on in response to the sense amplifier enable signal SAE having a logic high value, and thus, the node N3 may be grounded. In this case, a ground voltage may be provided to the source terminals of the transistors MN1 and MN2. The transistor MN3 may be turned off in response to the sense amplifier enable signal SAE having a logic low value, and thus, the node N3 may be floated. The transistor MN3 may be referred to as a "switching transistor".

The configuration of the voltage latch-type sense amplifier is illustrated in FIG. 2 as an example, but the present disclosure is not limited thereto. That is, the reference voltage generator 120 of the present disclosure may be applied to various latch-type sense amplifiers capable of determining a value stored in the memory cell MC by comparing a voltage output from the memory cell MC and the reference voltage Vref output from the reference voltage generator 120.

Figure 3:
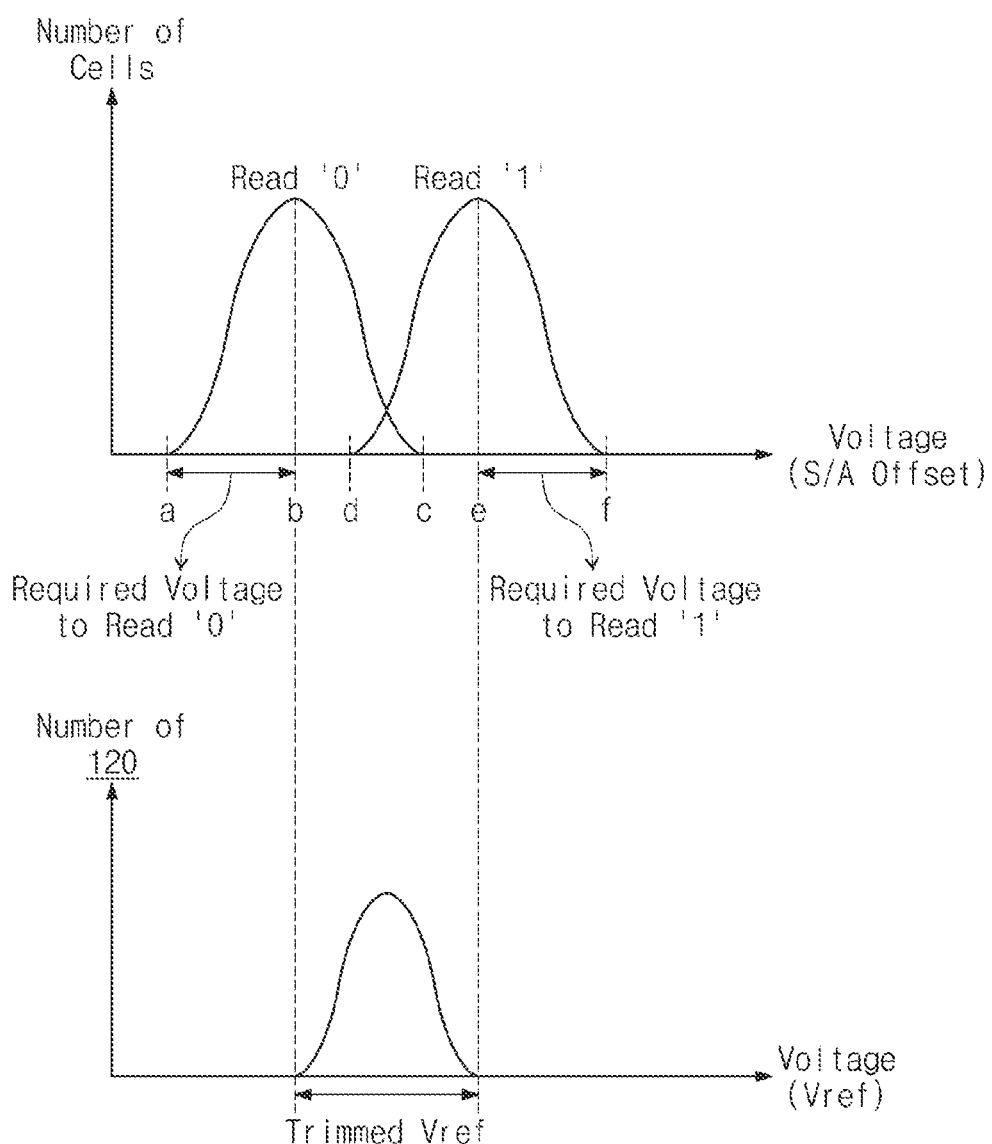
FIG. 3 is a graph illustrating an offset voltage distribution of a sense amplifier of FIG. 2 and a reference voltage distribution.

FIG. 3 is a graph illustrating an offset voltage distribution of a sense amplifier of FIG. 2 and a reference voltage distribution.

In detail, the offset voltage distribution of FIG. 3 represents a distribution of offset voltages of transistors included in all sense amplifiers included in one memory device. The reference voltage distribution of FIG. 3 represents a distribution of reference voltages generated by all reference voltage generators included in one memory device.

Referring to a graph (Read '0') associated with reading data "0" from among graphs of FIG. 3, offset voltages of transistors participating in reading data "0" may be distributed from "a" to "c", and the number of transistors having the offset voltage corresponding to "b" may be the most. Similarly, referring to a graph (Read '1') associated with reading data "1", offset voltages of transistors participating in reading data "1" may be distributed from "d" to "f", and the number of transistors having the offset voltage corresponding to "e" may be the most. As illustrated in FIG. 3, a period (i.e., a period from "d" to "c") where two distributions overlap each other may exist.

Meanwhile, because the distribution of the offset voltages of the transistors constituting the sense amplifier depends on a characteristic of a process of manufacturing a semiconductor device, it may not be easy to perform trimming for narrowing a width of the distribution of the offset voltages after the SRAM is manufactured. Accordingly, to reduce a read error of the SRAM, first, a magnitude of the reference voltage Vref should be distributed between "b" and "e", and there is a need to narrow the width of the reference voltage (Vref) distribution as much as possible.

In an embodiment, the reference voltage generator 120 (refer to FIG. 2) of the present disclosure may generate the reference voltage Vref having a stable value, and in addition, may perform a trimming function such that a value of the reference voltage Vref to be actually output has an intended value. For example, whether to perform trimming for a reference voltage and a detailed trimming value may be performed for each reference voltage generator 120 in a test process after the SRAM is manufactured. For example, the trimming may be performed based on the principle of voltage division. The trimming that is performed by the reference voltage generator 120 will be described with reference to FIG. 4.

Figure 4:
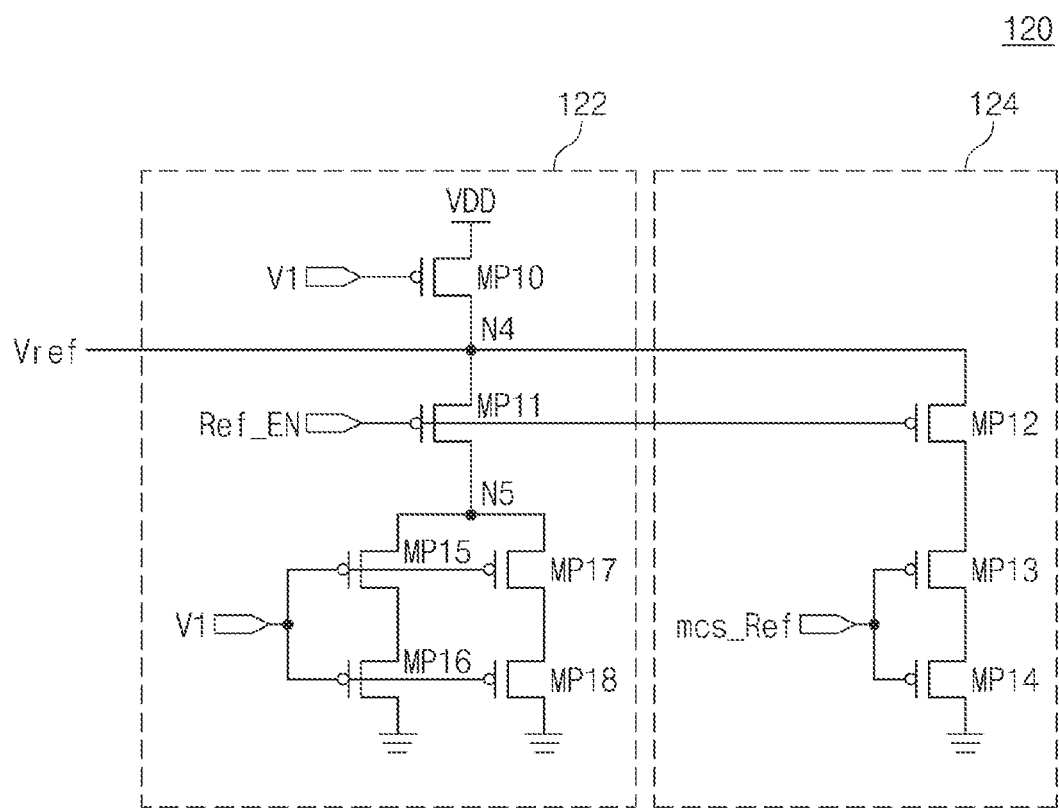
FIG. 4 and FIG. 5 are circuit diagrams illustrating configurations of a reference voltage generator illustrated in FIG. 2.
Figure 5:
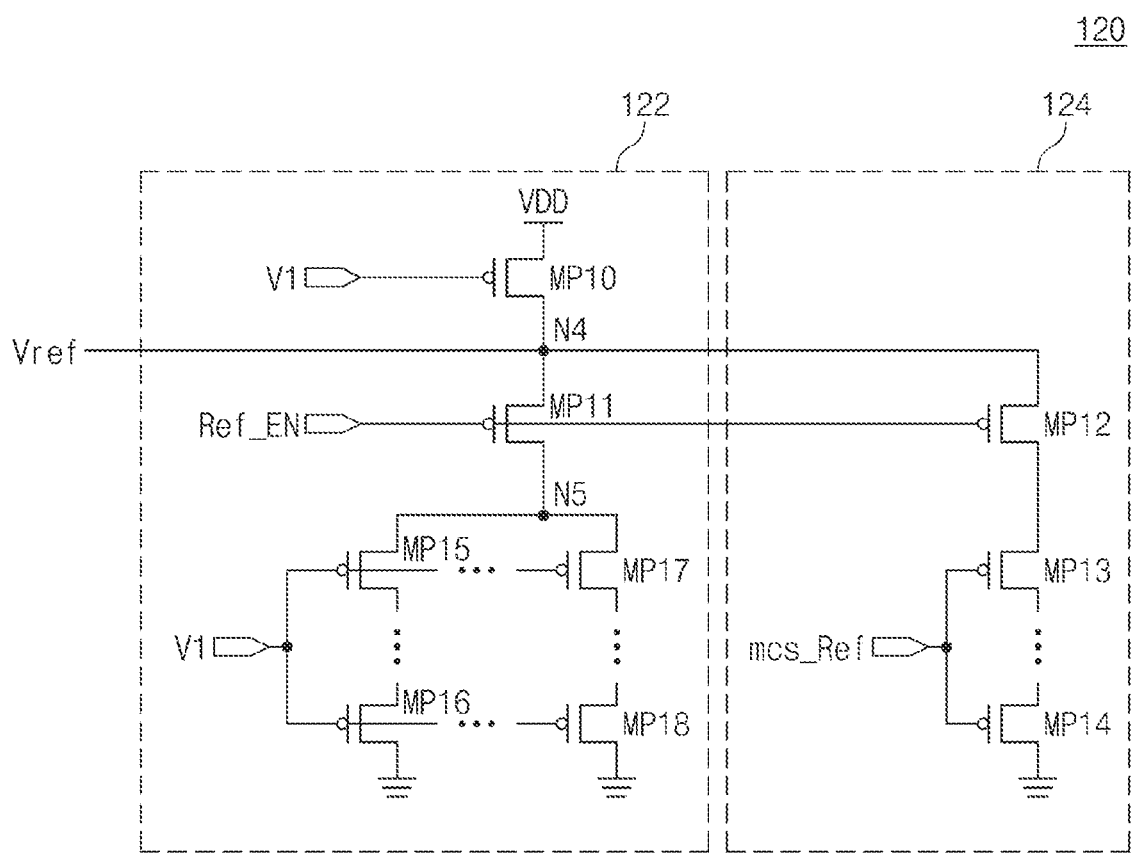

FIG. 4 and FIG. 5 are circuit diagrams illustrating configurations of the reference voltage generator 120 illustrated in FIG. 2.

Referring to FIG. 4, the reference voltage generator 120 may include a reference voltage generation circuit 122 and a reference voltage trimming circuit 124.

The reference voltage generation circuit 122 may be configured to divide the power supply voltage VDD to obtain a voltage (i.e., a reference voltage) of an appropriate level. As an example for implementing a voltage divider, the reference voltage generation circuit 122 may include at least one PMOS transistor that is provided between the terminal providing the power supply voltage VDD and a node N4 and performs a role of a resistor and at least one PMOS transistor that is provided between the node N4 and the ground voltage and performs a role of a resistor.

A transistor MP10 may be connected between the terminal providing the power supply voltage VDD and the node N4 and may operate in response to a voltage V1. For example, the voltage V1 may be applied to a gate of the transistor MP10. Herein, the voltage V1 may be a voltage for turning on the transistor MP10 always. Alternatively, the voltage V1 may be a voltage for turning on the transistor MP10 during the operation of the reference voltage generator 120. For example, a voltage generator may always provide the voltage V1 to the gate of the transistor MP10 or only provide the voltage V1 when the reference voltage generator 120 is being operated.

A transistor MP11 may be connected between the node N4 and a node N5. The transistor MP11 may operate in response to a reference voltage enable signal Ref_EN during the operation of the reference voltage generator 120. For example, the reference voltage enable signal Ref_EN may be received from a control logic circuit. For example, the control logic circuit may be located outside the voltage generation circuit 122.

In an embodiment, two strings may be connected between the node N5 and the terminal providing the ground voltage. The first string may include transistors MP15 and MP16 connected in series between the node N5 and the terminal providing the ground voltage, and the second string may include transistors MP17 and MP18 connected in series between the node N5 and the terminal providing the ground voltage. The transistors MP15, MP16, MP17, and MP18 may operate in response to the voltage V1.

During the sensing operation of the sense amplifier 130 (refer to FIG. 3), when the transistor MP11 is turned on by the reference voltage enable signal Ref_EN, the reference voltage Vref may be output from the node N4 by the voltage division according to a resistance value corresponding to the transistor MP10 and a resistance value corresponding to the transistors MP11, MP15, MP16, MP17, and MP18.

An example where the transistors MP15, MP16, MP17, and MP18 are simultaneously turned on by the voltage V1 is illustrated in FIG. 4, but the transistors MP15, MP16, MP17, and MP18 may be controlled independently of each other. In this case, gate electrodes of the transistors MP15 and MP16 may be connected with each other so as to be simultaneously controlled, and gate electrodes of the transistors MP17 and MP18 may be connected with each other so as to be simultaneously controlled.

The reference voltage trimming circuit 124 may be configured to trim a level of the reference voltage Vref. The reference voltage trimming circuit 124 may include PMOS transistors MP12, MP13, and MP14 connected in series with the node N4. The transistors MP13 and MP14 may operate in response to a trimming control signal mcs_Ref. For example, the trimming control signal mcs_Ref may be received from the control logic circuit.

During the sensing operation of the sense amplifier 130 (refer to FIG. 3), when the transistors MP12 are turned on by the reference voltage enable signal Ref_EN and the transistors MP13 and MP14 are turned on by the trimming control signal mcs_Ref, a voltage drop may be introduced by the transistors MP12, MP13, and MP14, and thus, the value of the reference voltage Vref may be trimmed.

In an embodiment, during a test operation of the SRAM 100 (refer to FIG. 1), whether to operate the reference voltage trimming circuit 124 may be determined while the reference voltage generation circuit 122 generates a reference voltage. For example, when the reference voltage Vref having a desired value is obtained without the operation of the reference voltage trimming circuit 124, there may be no need to operate the reference voltage trimming circuit 124. Accordingly, the SRAM may be set such that the reference voltage Vref is not trimmed by the reference voltage trimming circuit 124 even though the reference voltage generator 120 operates.

Meanwhile, in FIG. 4, the arrangement and connection relationship of the transistors MP15, MP16, MP17, and MP18 are intended to generate the reference voltage Vref having the desired level. Accordingly, even though the reference voltage generator 120 changes the level of the reference voltage Vref by using the reference voltage trimming circuit 124, the arrangement and connection relationship of PMOS transistors included in the reference voltage generation circuit 122 may be different from those illustrated in FIG. 4.

In an embodiment, as illustrated in FIG. 5, more strings may be connected with the node N5. In addition, each string connected with the node N5 may include two or more PMOS transistors. For example, the string that includes MP15 and MP16 could additionally include M17. Also, unlike the examples illustrated in drawings, each string may include only one PMOS transistor. For example, MP16 or M18 could be omitted in an embodiment.

Meanwhile, the embodiments where all the transistors constituting the reference voltage generator 120 are PMOS transistors are illustrated in FIGS. 4 and 5, and this is for generating reference voltage Vref stably. This will be described with reference to a graph of FIG. 6.

Figure 6:
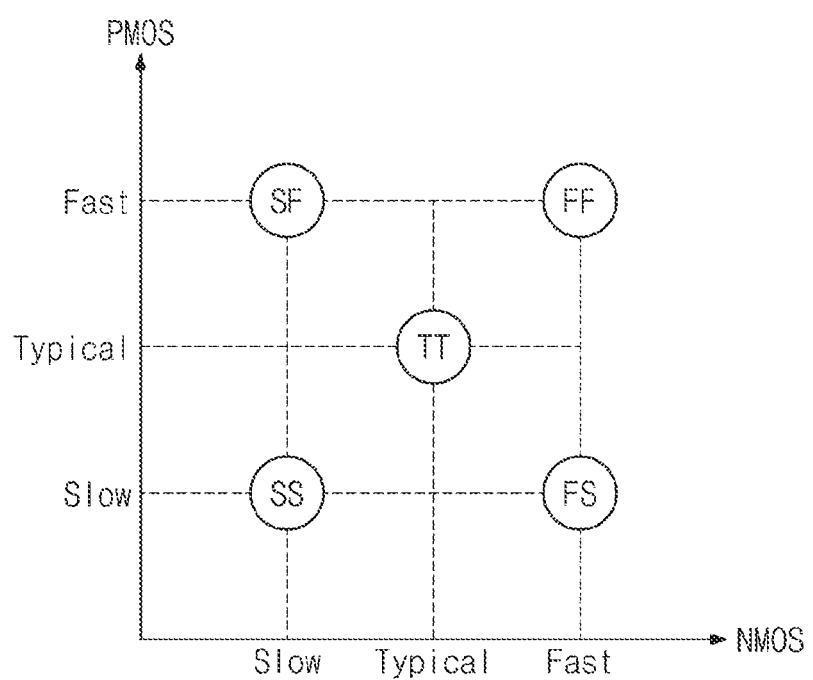
FIG. 6 is a diagram illustrating a distribution of transistors of a memory device including an SRAM of the present disclosure.

FIG. 6 is a diagram illustrating a distribution of transistors of a memory device including an SRAM of the present disclosure.

In FIG. 6, a horizontal axis represents an attribute of an NMOS transistor, and a vertical axis represents an attribute of a PMOS transistor. Herein, PMOS transistors and NMOS transistors may be transistors provided through the same process. Each transistor may have one of five states TT, SS, SF, FS, and FF. Among two letters indicating each state, the first letter may indicate an NMOS attribute, and the second letter may indicate a PMOS attribute. The letter "S" indicates a slow cell, the letter "F" indicates a fast cell, the letter "T" indicates a typical or target cell. The fast cell may have attributes: a fast operation speed, an excellent driving ability, and a small leakage. In contrast, the slow cell may have attributes: a slow operation speed, a low driving ability, and a great leakage.

Transistors that are manufactured from the same wafer through the same process may be distributed over the entire area of the distribution diagram of FIG. 6. A distribution of PMOS transistors may be different from a distribution of NMOS transistors, and transistors of the same type formed in adjacent areas may have the same attribute with high probability. That is, PMOS transistors formed in adjacent areas may be the same fast cell with high probability, may be the same typical cell with high probability, or may be the same slow cell with high probability.

In contrast, even though transistors are formed in adjacent areas from the same wafer through the same process, the PMOS transistor and the NMOS transistor may have different attributes. For example, in the case where the reference voltage generator 120 includes a PMOS transistor and an NMOS transistor, the PMOS transistor may have the attribute of the fast cell, and the NMOS transistor may have the attribute of the slow cell. Alternatively, the PMOS transistor may have the attribute of the slow cell, and the NMOS transistor may have the attribute of the fast cell. In this case, the reference voltage Vref of a desired value may not be generated due to a driving ability difference of the PMOS transistor and the NMOS transistor.

According to the present disclosure, the reference voltage generator 120 (refer to FIGS. 3 and 4) may be configured to include transistors of the same type (i.e., PMOS transistors) based on the above attributes. As a result, because the reference voltage generator 120 are implemented with the transistors of the same type having similar attributes, a difference between the reference voltages Vref respectively generated by the reference voltage generators 120 may be small. That is, the reference voltage generator 120 may generate the reference voltage Vref that is insensitive to the distributions illustrated in FIG. 3.

Figure 7:
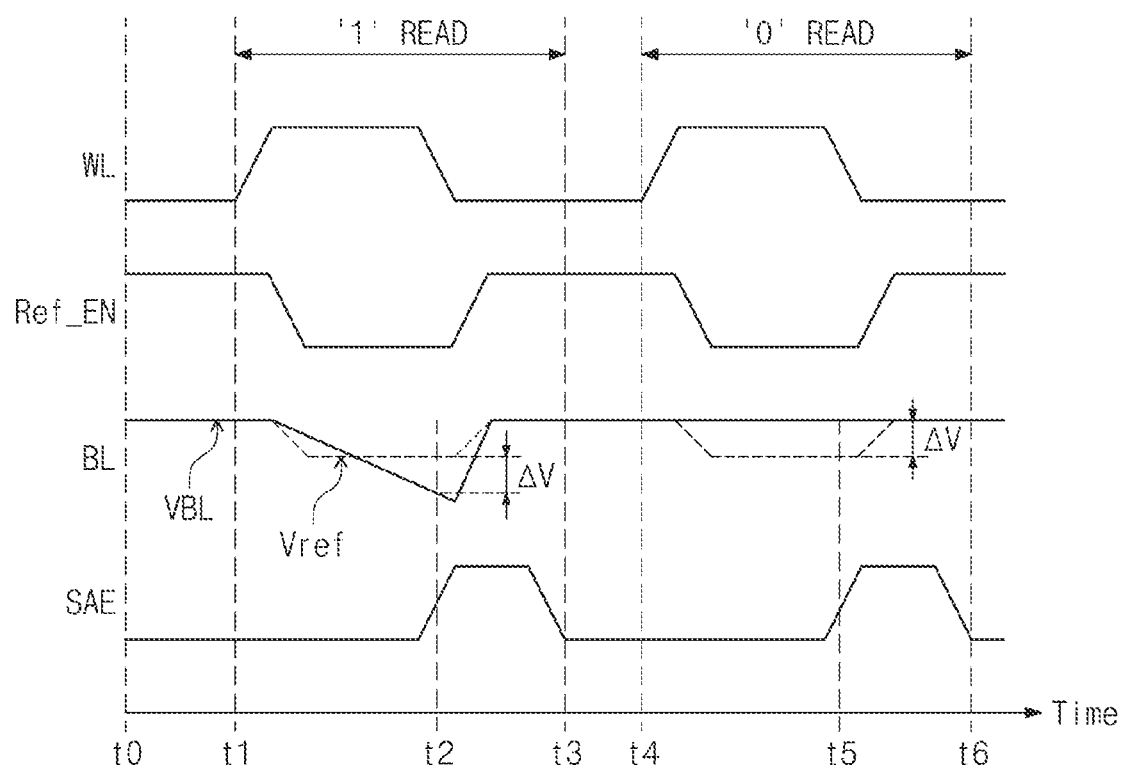
FIG. 7 is a diagram illustrating operation waveforms of an SRAM of the present disclosure.

FIG. 7 is a diagram illustrating operation waveforms of an SRAM of the present disclosure.

Referring to FIGS. 2, 4, and 7, when a word line WL targeted for the read operation is selected, an operation for reading a value of "1" stored in the memory cell MC may start.

At a point in time t1, the word line WL may be selected by a row decoder, and the selected word line WL may be driven with a voltage of a logic high level. Afterwards, the reference voltage enable signal Ref_EN may be activated (i.e., low enabled) by the control logic circuit, and the reference voltage enable signal Ref_EN may be input to the reference voltage generator 120. The reference voltage generator 120 may generate the reference voltage Vref in response to the reference voltage enable signal Ref_EN.

Because the reference voltage Vref is output through the reference bit line BL_ref, the voltage level of the reference bit line BL_ref may decrease and may then be maintained uniformly. At the same time with the generation of the reference voltage Vref, charges stored in the memory cell MC may be output through the bit line BL, and thus, a voltage level VBL of the bit line BL may decrease with a gradual slope.

Immediately before a point in time t2, the transistors MP1, MP2, and MN3 may be turned on by the sense amplifier enable signal SAE. As a result, the bit line BL may be connected with the node N1, and the reference bit line BL_ref may be connected with the node N2.

At the point in time t2, the sense amplifier 130 may compare the voltage level VBL of the bit line BL and the voltage level (i.e., Vref) of the reference bit line BL_ref. When a difference between the voltage level Vref of the reference bit line BL_ref and the voltage level VBL of the bit line BL is greater than or equal to a specific value (i.e., ΔV), it may be determined that a value stored in the memory cell MC is "1", and the signal SOUT may be output as a discrimination result.

Afterwards, in a time period from t4 to t6, an operation for reading a value of "0" stored in the memory cell MC may be performed. The operation for reading data "0" may be mostly similar to the operation for reading data "1". However, due to the value stored in the memory cell MC, the voltage level VBL of the bit line BL may be uniformly maintained. When the difference between the voltage level VBL of the bit line BL and the voltage level Vref of the reference bit line BL_ref is greater than or equal to the specific value (i.e., ΔV), it may be determined that a value stored in the memory cell MC is "0", and the signal SOUT may be output as a discrimination result.

Figure 8:
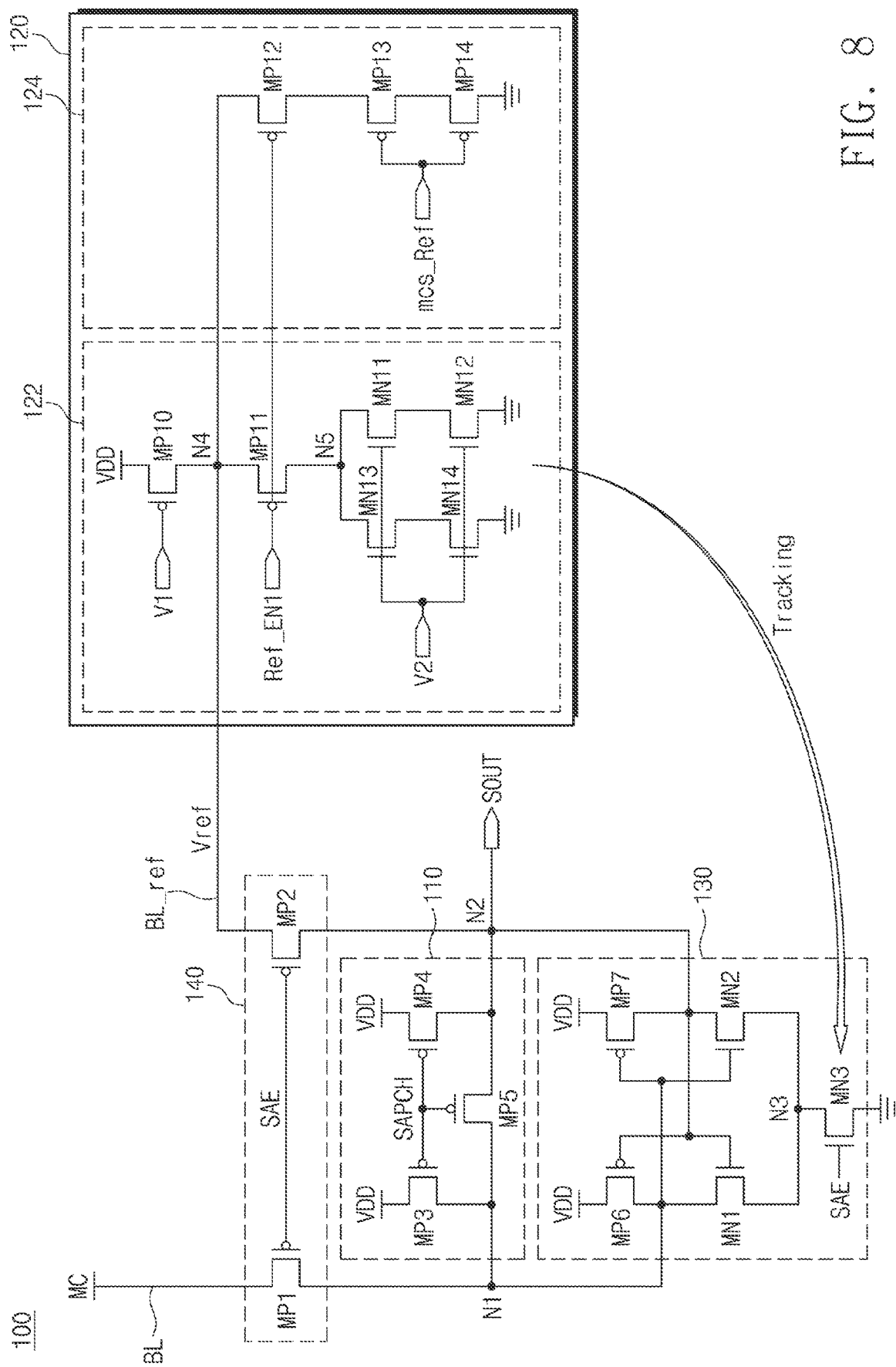
FIG. 8 is a circuit diagram illustrating a configuration of a reference voltage generator illustrated in FIG. 2.

FIG. 8 is a circuit diagram illustrating a configuration of the reference voltage generator 120 illustrated in FIG. 2. For better understanding, any other components constituting the SRAM are illustrated together in addition to the reference voltage generator 120.

The reference voltage generator 120 may include the reference voltage generation circuit 122 and the reference voltage trimming circuit 124. The reference voltage generation circuit 122 may include PMOS transistors MP10 and MP11 and NMOS transistors MN11, MN12, MN13, and MN14, and the reference voltage trimming circuit 124 may include PMOS transistors MP12, MP13, and MP14.

The basic function and operation of the reference voltage generator 120 may be mostly identical to those of the reference voltage generator 120 described with reference to FIG. 4. That is, the voltage V1 may be a voltage for turning on the transistor MP10 always, and a voltage V2 may be a voltage for turning on the transistors MN11, MN12, MN13, and MN14 always. Alternatively, the voltage V1 and the voltage V2 may be voltages for turning on the transistors MP10, MN11, MN12, MN13, and MN14 when the transistor MP11 is turned on.

In another embodiment, the arrangement and/or the connection relationship of NMOS transistors of the reference voltage generation circuit 122 may be variously changed or modified. For example, a string including the transistors MN11 and MN12 and/or a string including the transistors MN13 and MN14 may further include an NMOS transistor. In contrast, an example where each string connected with the node N5 includes two NMOS transistors is illustrated, but each string may include only one NMOS transistor.

According to the manufacturing process of the SRAM, the driving ability of some of transistors constituting the reference voltage generator 120 of FIG. 8 may be different from the driving ability of transistors constituting the reference voltage generator 120 of FIG. 4. The reason may be that the transistor MN3 grounding the node N3 is an NMOS transistor.

For example, when the NMOS transistor MN3 of the sense amplifier 130 is of the slow type (i.e., when the driving ability is low), a speed (or slope) at which the voltage level of the node N3 decreases when the transistor MN3 is turned on may be slow. Accordingly, when the reference voltage Vref is generated by using a reference voltage generator composed of only PMOS transistors as illustrated in FIG. 4, a read error may occur due to the mismatch of the timing at which the sense amplifier enable signal SAE is activated and the slope at which the voltage level of the node N3 decreases. This may mean that the ability for transistors constituting the reference voltage generator 120 to track the transistor MN3 of the sense amplifier 130 is reduced.

According to an embodiment of the present disclosure, to prevent the reduction of the ability to track the transistor MN3, the reference voltage generator 120 includes NMOS transistors. When the reference voltage generator 120 is implemented to include NMOS transistors, the level of the reference voltage Vref may be trimmed independently of the operation of the reference voltage trimming circuit 124. This will be described with reference to FIGS. 9 to 12.

Figure 9:
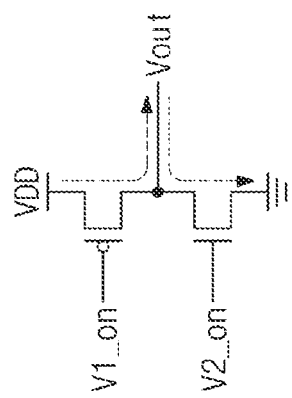
FIG. 9 is a diagram for describing how a level of an output voltage varies depending on an attribute of a transistor.

FIG. 9 is a diagram for describing how a level of an output voltage varies depending on an attribute of a transistor.

Referring to FIG. 9, a PMOS transistor and an NMOS transistor connected in series between the terminal providing the power supply voltage VDD and the terminal providing the ground voltage are illustrated. A voltage V1_on for turning on the PMOS transistor is applied to a gate electrode of the PMOS transistor, and a voltage V2_on for turning on the NMOS transistor is applied to a gate electrode of the NMOS transistor.

First, in Case 1, it is assumed that depending on the distribution diagram described with reference to FIG. 6, the driving ability of the PMOS transistor intended by the memory vendor is 10 and the driving ability of the NMOS transistor intended by the memory vendor is 5. Herein, numerical values are relative and are conceptually provided to express only the driving ability. In this case, a value of an output voltage Vout may be determined depending on the driving ability (i.e., the ability to output a current) of the PMOS transistor and the driving ability of the NMOS transistor, and the value of the output voltage Vout may be a value intended by the memory vendor.

Next, in Case 2, it is assumed that the driving ability of the PMOS transistor (e.g., having the attribute of the slow cell) is 8 and the driving ability of the NMOS transistor (e.g., having the attribute of the fast cell) is 7. In this case, the voltage drop by the PMOS transistor may be larger than the voltage drop in Case 1 and the voltage drop by the NMOS transistor may be smaller than the voltage drop in Case 1. Accordingly, the value of the output voltage Vout may be smaller than the value of the target output voltage Vout in Case 1.

Lastly, in Case 3, it is assumed that the driving ability of the PMOS transistor (e.g., having the attribute of the fast cell) is 12 and the driving ability of the NMOS transistor (e.g., having the attribute of the slow cell) is 3. In this case, the voltage drop by the PMOS transistor may be smaller than the voltage drop in Case 1 and the voltage drop by the NMOS transistor may be larger than the voltage drop in Case 1. Accordingly, the value of the output voltage Vout may be larger than the value of the target output voltage Vout in Case 1.

The reference voltage generator 120 described with reference to FIG. 8 may include the NMOS transistors MN11, MN12, MN13, and MN14 based on the above characteristics. As such, the value of the reference voltage Vref generated by the reference voltage generation circuit 122 may be larger than the value of the reference voltage Vref generated by the reference voltage generator 120 composed of only PMOS transistors (i.e., in the embodiment of FIG. 4). That is, when the NMOS transistor MN3 of the sense amplifier 130 (refer to FIG. 8) has the attribute of the slow cell, the transistors of the reference voltage generator 120 may well track the transistor MN3 of the sense amplifier 130, and thus, the mismatch due to a slope change of the voltage (i.e., the voltage of the bit line BL) output through the transistor MN3 may be prevented. This will be described in detail with reference to FIGS. 10 to 13.

FIGS. 10 to 13 are diagrams illustrating graphs for describing a read error due to a slope change of a voltage of the bit line BL and how to correct the read error. For better understanding, the description will be given with reference to FIG. 8 together.

Figure 10:
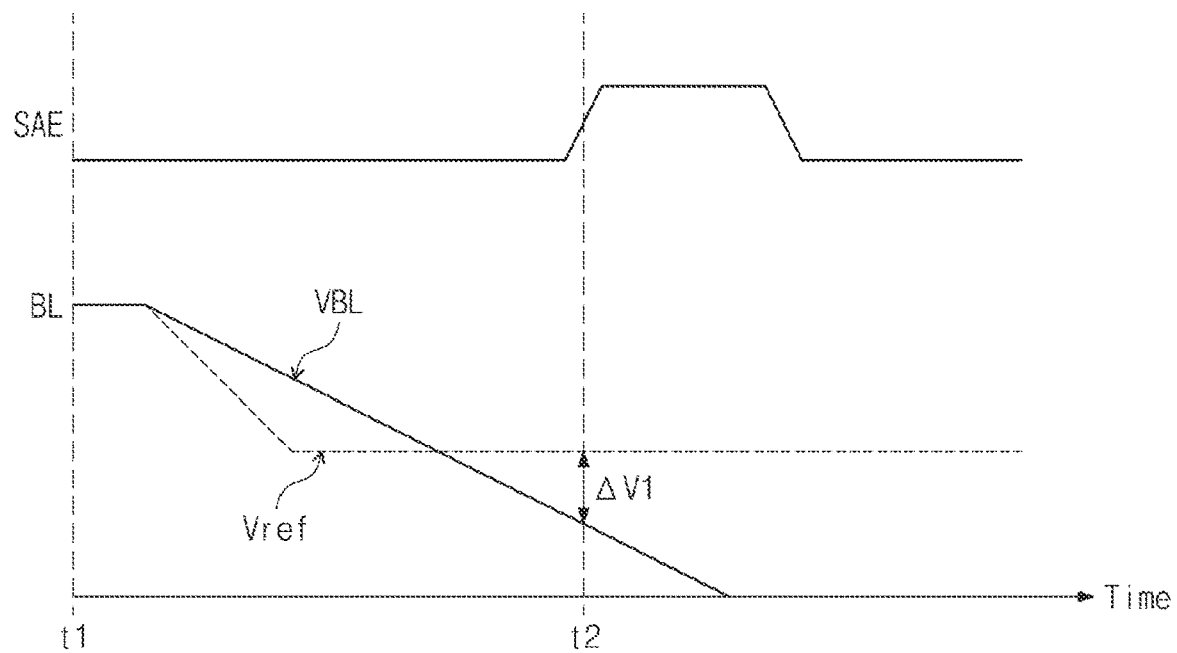
FIGS. 10 to 13 are diagrams illustrating graphs for describing a read error due to a slope change of a voltage of a bit line and how to correct the read error.

FIG. 10 shows the change in the voltage VBL of the bit line BL in the read operation. The graph of FIG. 10 illustrates the case where the reference voltage generator 120 and the sense amplifier 130 are manufactured as intended by the memory vendor. At a point in time t2 when the sense amplifier enable signal SAE is activated, a difference between the reference voltage Vref and the bit line voltage VBL may be ΔV1. Herein, ΔV1 may be a voltage sufficient to determine data stored in the memory cell MC.

Figure 11:
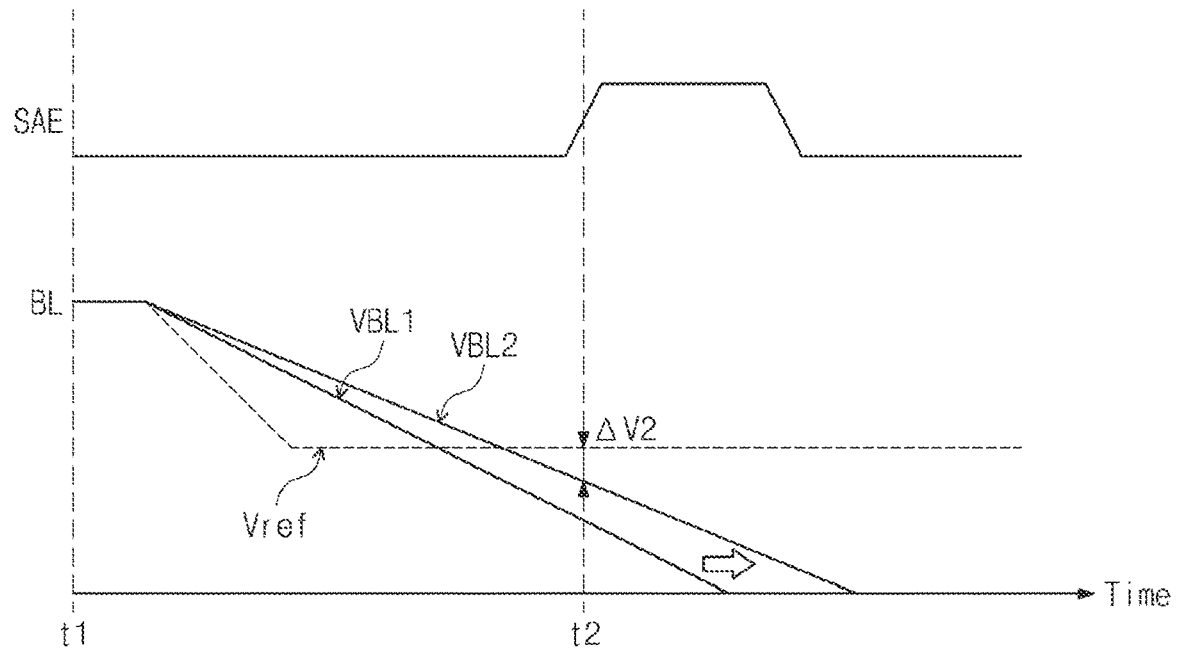

FIG. 11 shows a change in the bit line voltage VBL associated with the issue capable of occurring when the transistor MN3 of the sense amplifier 130 has the attribute of the slow cell. A bit line voltage VBL1 indicates a bit line voltage associated with the case of FIG. 10, and a bit line voltage VBL2 indicates a bit line voltage when the transistor MN3 has the attribute of the slow cell. When the transistor MN3 has the attribute of the slow cell, the driving ability of the transistor MN3 may be reduced. In this case, a speed at which charges are discharged to the ground terminal through the bit line BL may be slow. As such, the slope of the bit line voltage VBL2 may be gradual compared to the slope of the bit line voltage VBL1.

At a point in time when the sense amplifier enable signal SAE is activated, a difference between the reference voltage Vref and the bit line voltage VBL may be ΔV2. However, ΔV2 may be a voltage insufficient to determine data stored in the memory cell MC. In this case, the read error may occur in the SRAM 100.

Figure 12:
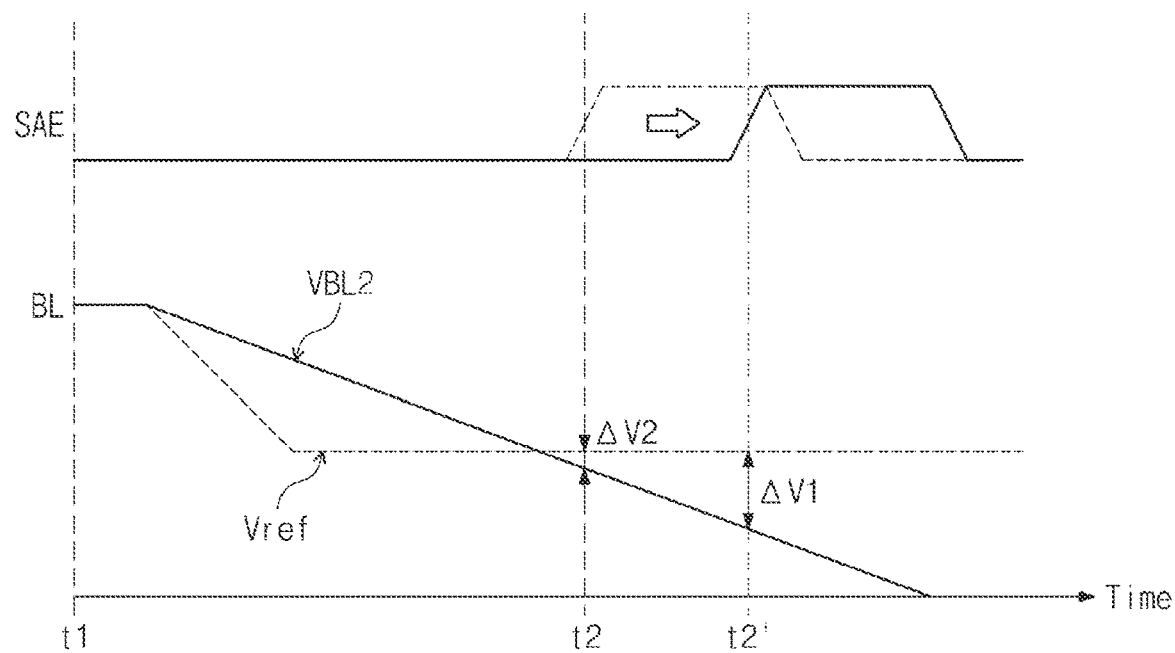

FIG. 12 is a diagram illustrating how to prevent a read error of an SRAM from occurring in the embodiment of FIG. 11. In detail, when the transistor MN3 of the sense amplifier 130 has the attribute of the slow cell, the point in time when the sense amplifier enable signal SAE is activated may be delayed from t2 to t2', and thus, a voltage difference ΔV1 sufficient to determine data stored in the memory cell MC may be secured. For example, the control logic circuit may delay the timing to activate the sense amplifier enable signal SAE. However, in this case, because the timing to activate the sense amplifier enable signal SAE is delayed, the read speed may decrease.

Figure 13:
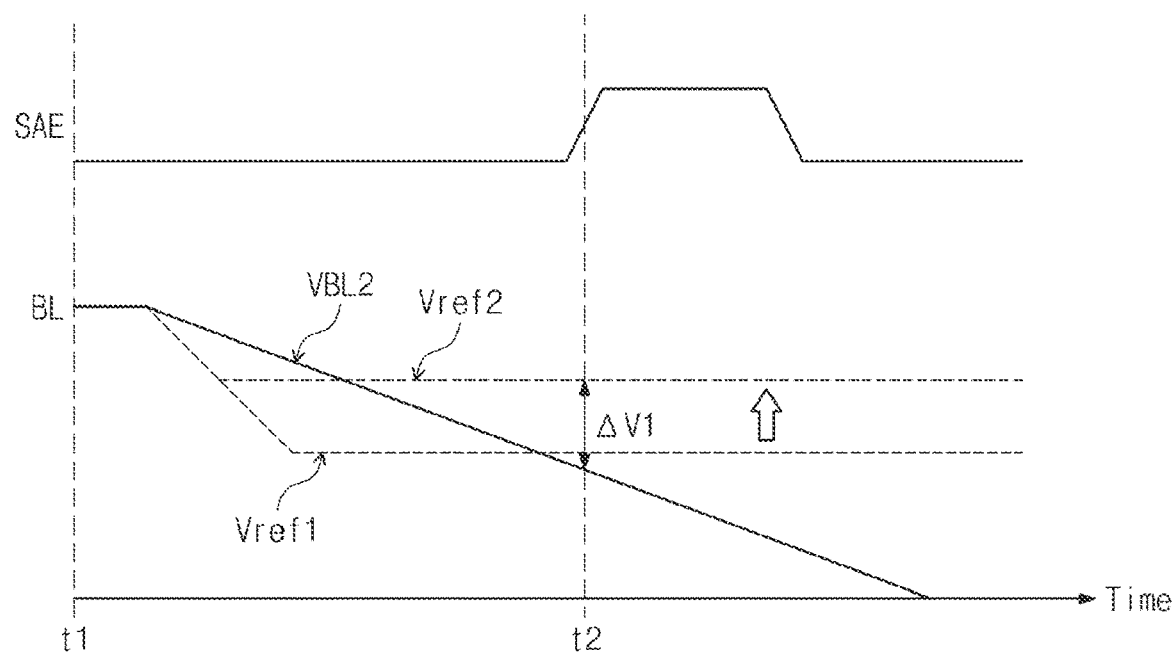

FIG. 13 is a diagram illustrating how to prevent a read error of an SRAM from occurring in the embodiment of FIG. 11. A reference voltage Vref1 indicates a reference voltage when the reference voltage generator 120 is composed of only PMOS transistors as illustrated in FIG. 4, and a reference voltage Vref2 indicates a reference voltage when the reference voltage generation circuit 122 includes NMOS transistors having the attribute of the slow cell as illustrated in FIG. 8.

As described with reference to FIG. 9, when the reference voltage generation circuit 122 includes NMOS transistors, the attribute of the reference voltage generation circuit 122 may be similar to the attribute of the transistor MN3 of the sense amplifier 130. That is, the NMOS transistors MN11, MN12, MN13, and MN14 of the reference voltage generation circuit 122 may have the attribute of the slow cell. As the driving ability of the NMOS transistors MN11, MN12, MN13, and MN14 decreases, the level of the reference voltage Vref2 output from the reference voltage generator 120 may increase. Accordingly, a difference between the reference voltage Vref2 and the bit line voltage VBL2 may be secured to be sufficient to determine data stored in the memory cell MC.

According to the embodiment of FIG. 13, the read fail may be prevented by implementing the reference voltage generation circuit 122 with NMOS transistors. In addition, unlike FIG. 12, because the timing to activate the sense amplifier enable signal SAE is not delayed, the speed of the read operation may not decrease.

Figure 14:
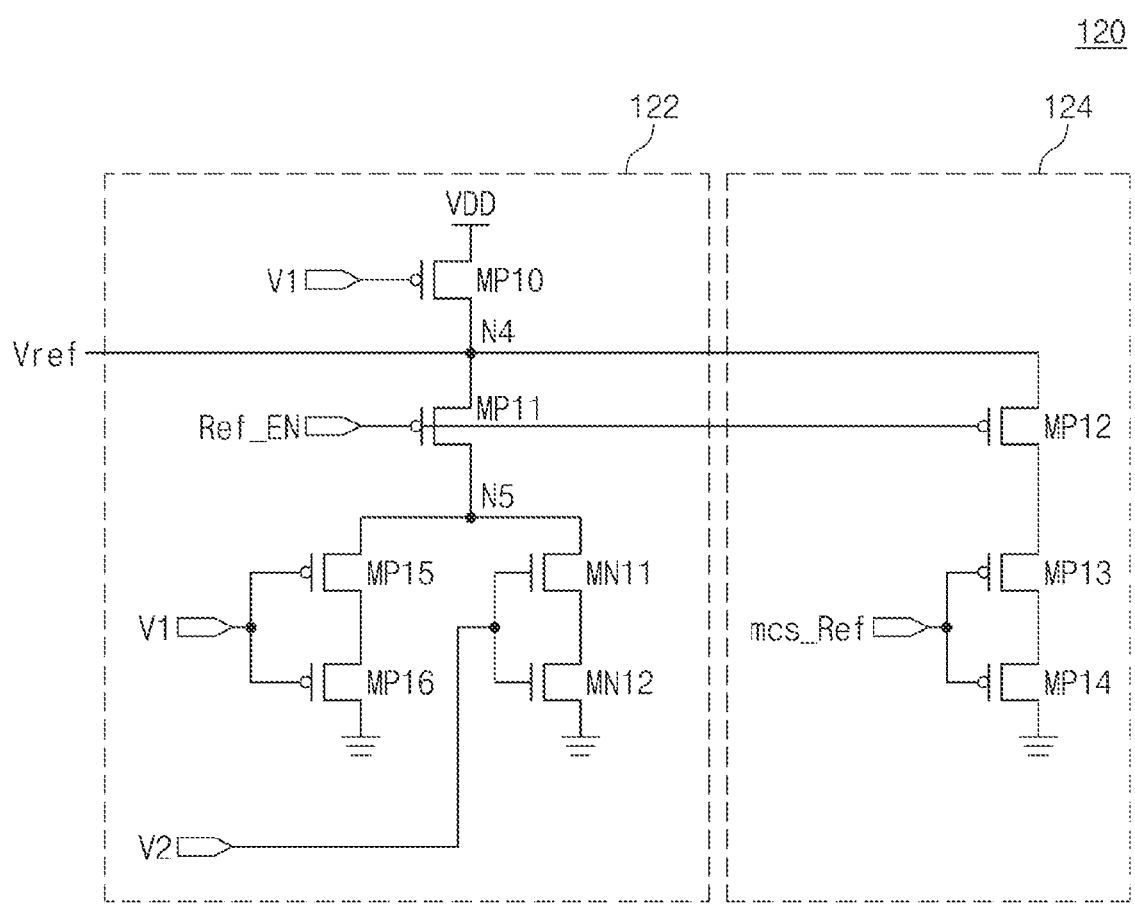
FIG. 14 is a circuit diagram illustrating a configuration of a reference voltage generator illustrated in FIG. 2.

FIG. 14 is a circuit diagram illustrating a configuration of the reference voltage generator 120 illustrated in FIG. 2 according to an embodiment.

The reference voltage generator 120 may include the reference voltage generation circuit 122 and the reference voltage trimming circuit 124. The reference voltage generation circuit 122 may include PMOS transistors MP10, MP11, MP15, and MP16 and NMOS transistors MN11 and MN12. The reference voltage trimming circuit 124 may include PMOS transistors MP12, MP13, and MP14.

The basic function and operation of the reference voltage generator 120 may be mostly identical to those of the reference voltage generator 120 described with reference to FIG. 4. That is, the voltage V1 may be a voltage for turning on the transistors MP10, MP15, and MP16 always, and the voltage V2 may be a voltage for turning on the transistors MN11 and MN12 always. Alternatively, the voltage V1 and the voltage V2 may be voltages for turning on the transistors MP10, MP15, MP16, MN11, and MN12 when the transistor MP11 is turned on.

Meanwhile, depending on the manufacturing process of the SRAM, the driving ability of some of transistors constituting the reference voltage generator 120 of FIG. 8 may be different from the driving ability of transistors constituting the reference voltage generator 120 of FIG. 4. The reason is that the transistor MN3 grounding the node N3 is an NMOS transistor.

For example, when the transistor MN3 of the sense amplifier 130 has the attribute of the slow cell (i.e., when the driving ability is reduced), the read error may occur due to the mismatch of the timing to activate the sense amplifier enable signal SAE and the slope at which the voltage level of the node N3 decreases. In addition, like the embodiment of FIG. 8, when all transistors between the transistor MP11 receiving the reference voltage enable signal Ref_EN and the ground voltage are implemented with an NMOS transistor, a distribution of reference voltages generated by reference voltage generators of a semiconductor device may widen.

Accordingly, the reference voltage generation circuit 122 of the present disclosure may secure the ability for the reference voltage generator 120 to track the NMOS transistor MN3 of the sense amplifier 130 (refer to FIG. 2) and may also be implemented with the PMOS transistors MP15 and MP16 and the NMOS transistors MN11 and MN12 to make the reference voltage distribution narrow.

In an embodiment, the arrangement and/or the connection relationship of PMOS transistors and NMOS transistors of the reference voltage generation circuit 122 may be variously changed or modified. For example, a string including the PMOS transistors MP15 and MP16 may further include a PMOS transistor, and a string including the NMOS transistors MN11 and MN12 may further include an NMOS transistor. For example, a string including at least one PMOS transistor and/or at least one NMOS transistor may be further connected between the node N5 and the terminal providing the ground voltage.

Figure 15:
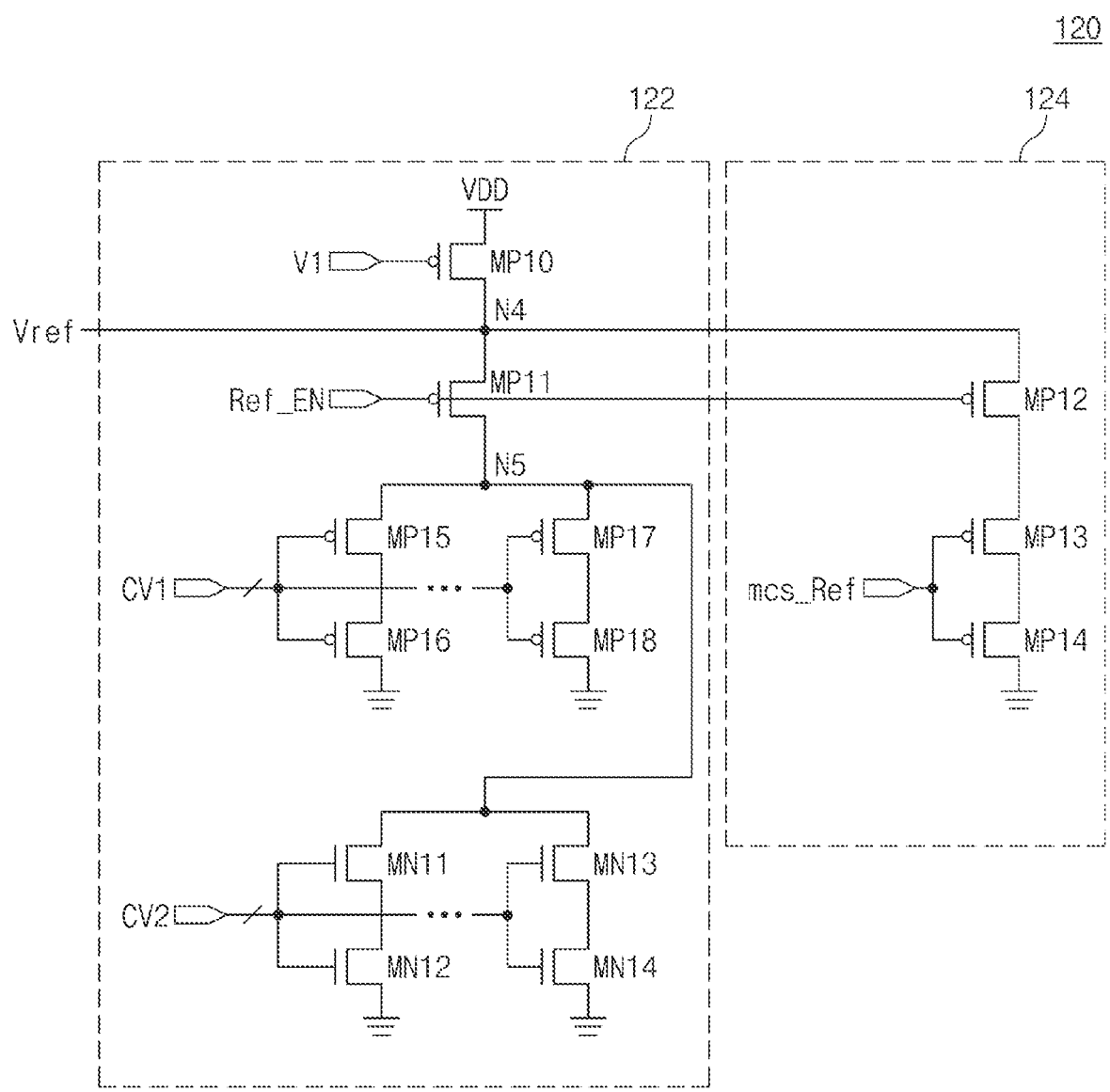
FIG. 15 is a circuit diagram illustrating a configuration of a reference voltage generator illustrated in FIG. 2.

FIG. 15 is a circuit diagram illustrating a configuration of the reference voltage generator 120 illustrated in FIG. 2 according to an embodiment.

The reference voltage generator 120 may include the reference voltage generation circuit 122 and the reference voltage trimming circuit 124. The reference voltage generation circuit 122 may include PMOS transistors MP10, MP11, MP15, MP16, MP17, and MP18 and NMOS transistors MN11, MN12, MN13, and MN14. The reference voltage trimming circuit 124 may include PMOS transistors MP12, MP13, and MP14.

The basic function and operation of the reference voltage generator 120 may be mostly similar to those of the reference voltage generator 120 described with reference to FIG. 4. That is, the voltage V1 may be a voltage for turning on the transistor MP10 always or a voltage for turning on the transistor MP10 when the transistor MP11 is turned on. The reference voltage enable signal Ref_EN may have a voltage for turning on the transistor MP11 during the operation of the reference voltage generator 120.

In an embodiment, the PMOS transistors MP15, MP16, MP17, and MP18 may be selectively turned on or turned off by first code values CV1. For example, the transistors MP15 and MP16 may be turned on by the first code values CV1, and the transistors MP17 and MP18 may be turned off by the first code values CV1; alternatively, the transistors MP15 and MP16 may be turned off by the first code values CV1, and the transistors MP17 and MP18 may be turned on by the first code values CV1. Similarly, the NMOS transistors MN11, MN12, MN13, and MN14 may be selectively turned on or turned off by second code values CV2. For example, the transistors MN11 and MN12 may be turned on by the second code values CV2, and the transistors MN13 and MN14 may be turned off by the second code values CV2; alternatively, the transistors MN11 and MN12 may be turned off by the second code values CV2, and the transistors MN13 and MN14 may be turned on by the second code values CV2.

In an embodiment, the arrangement and/or the connection relationship of PMOS transistors and NMOS transistors of the reference voltage generation circuit 122 may be variously changed or modified. For example, a string including the PMOS transistors MP15 and MP16 and/or a string including the PMOS transistors MP17 and MP18 may further include a PMOS transistor, and a string including the NMOS transistors MN11 and MN12 and/or a string including the NMOS transistors MN13 and MN14 may further include an NMOS transistor. In contrast, an example where each string connected with the node N5 includes two PMOS transistors or two NMOS transistors is illustrated, but each string may include only one PMOS transistor or only one NMOS transistor.

According to the above embodiment, it may be possible to implement the reference voltage generation circuit 122 described with reference to FIGS. 2, 8, and 14 by variously setting the first code values CV1 and the second code values CV2. For example, when the first code values CV1 are enabled and the second code values CV2 are disabled, the configuration and operation of the reference voltage generator 120 of FIG. 15 may be similar to the configuration and operation of the reference voltage generator 120 of FIG. 2.

For example, when the first code values CV1 are disabled and the second code values CV2 are enabled, the operation of the reference voltage generator 120 of FIG. 15 may be similar to the operation of the reference voltage generator 120 of FIG. 8. When some of the first code values CV1 are enabled and some of the second code values CV2 are enabled, the configuration and operation of the reference voltage generator 120 of FIG. 15 may be similar to the configuration and operation of the reference voltage generator 120 of FIG. 14.

Figure 16:
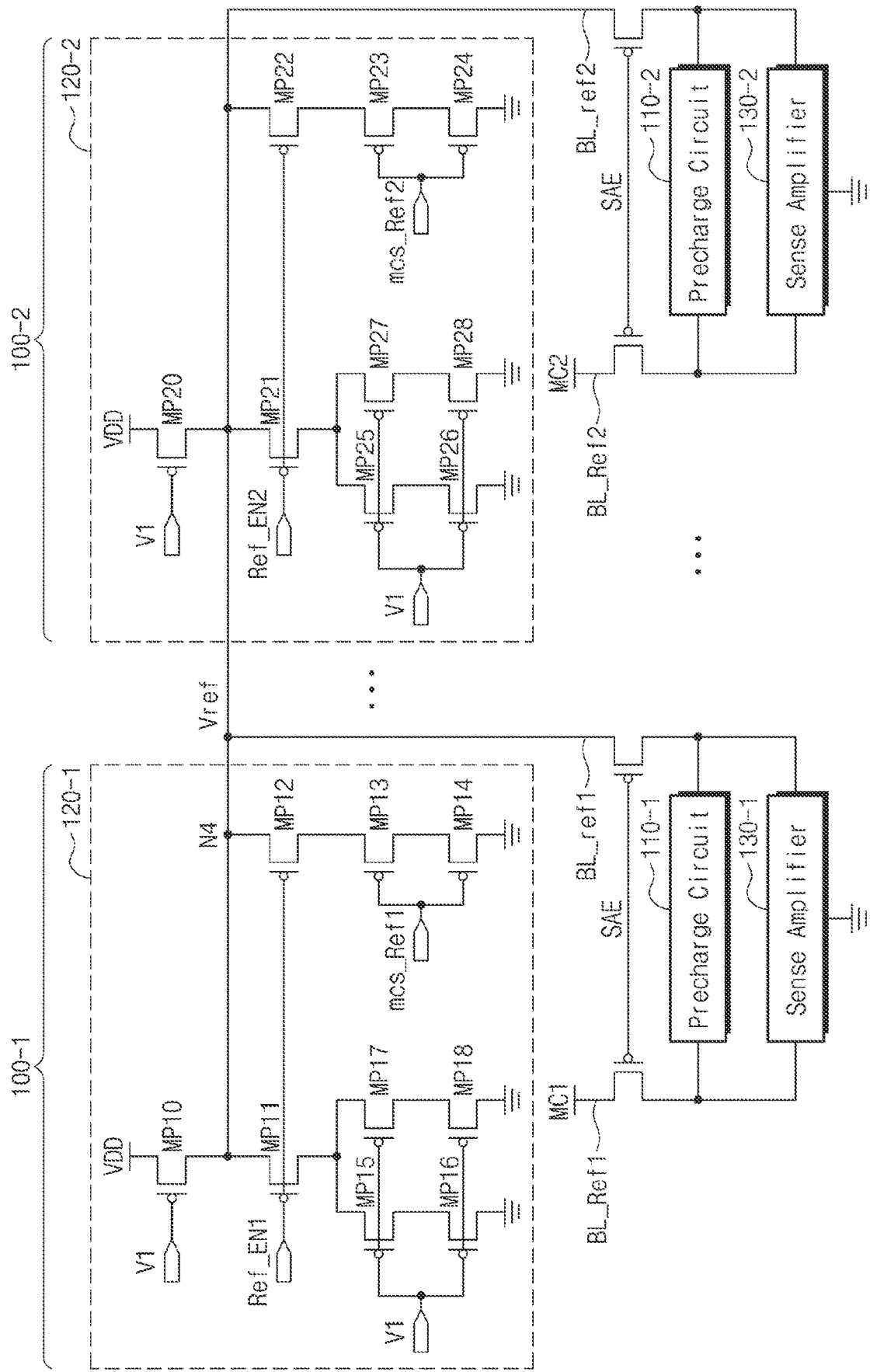
FIG. 16 is a circuit diagram illustrating configurations of SRAMs according to an embodiment of the present disclosure.

FIG. 16 is a circuit diagram illustrating configurations of SRAMs according to an embodiment of the present disclosure.

A first SRAM 100-1 may include a memory cell MC1, a precharge circuit 110-1, a reference voltage generator 120-1, and a sense amplifier 130-1. A second SRAM 100-2 may include a memory cell MC2, a precharge circuit 110-2, a reference voltage generator 120-2, and a sense amplifier 130-2. Functions and operations of components of each of the first SRAM 100-1 and the second SRAM 100-2 may be mostly identical/similar to those described with reference to FIGS. 1 to 15. However, an example where a reference voltage generation circuit of each of the reference voltage generators 120-1 and 120-2 includes PMOS transistors is illustrated, but the present disclosure is not limited thereto.

Transistors MP1 and MP12 of the reference voltage generator 120-1 may operate in response to a first reference voltage enable signal Ref_EN1. The precharge circuit 110-1 may be connected to a reference bit line BL_ref1. The precharge circuit 110-2 may be connected to a reference bit line BL_ref2. The precharge circuit 110-2 may includes transistor MP20 similar to transistor MP10, transistor MP21 similar to transistor MP11, transistor MP22 similar to transistor MP12, transistor MP23 similar to transistor MP13, transistor MP24 similar to transistor MP14, transistor MP25 similar to transistor MP15, transistor MP26 similar to transistor MP16, transistor MP27 similar to transistor MP17 and transistor MP28 similar to transistor MP18.

In an embodiment, the nodes N4 through which the reference voltages Vref are output from the reference voltage generators 120-1 and 120-2 may be connected with each other. For example, when the read operation is simultaneously performed on the memory cells MC1 and MC2, the reference voltage generators 120-1 and 120-2 may simultaneously operate. As such, the reference voltages Vref output from the reference voltage generators 120-1 and 120-2 through the nodes N4 may have the same value, and the distribution of the reference voltages Vref may narrow. Accordingly, the uniform reference voltage Vref may allow the chance of the read fail of the SRAM occurring to decrease. For example, the reference voltage generator 120-1 may output a first reference voltage and the reference voltage generator 120-2 may output a second reference voltage. For example, the first reference voltage and the second reference voltage may be output to a same reference bit line BL_Ref1.

In an embodiment, when the read operation is performed on one memory cell (e.g., MC1) among memory cells connected with one row, in addition to the reference voltage generator 120-1, at least one or more reference voltage generators (e.g., 120-2) among the remaining reference voltage generators may also operate. In this case, the number of reference voltage generators to be used may be determined according to a policy in consideration of the reference voltage (Vref) distribution in a test process.

Figure 17:
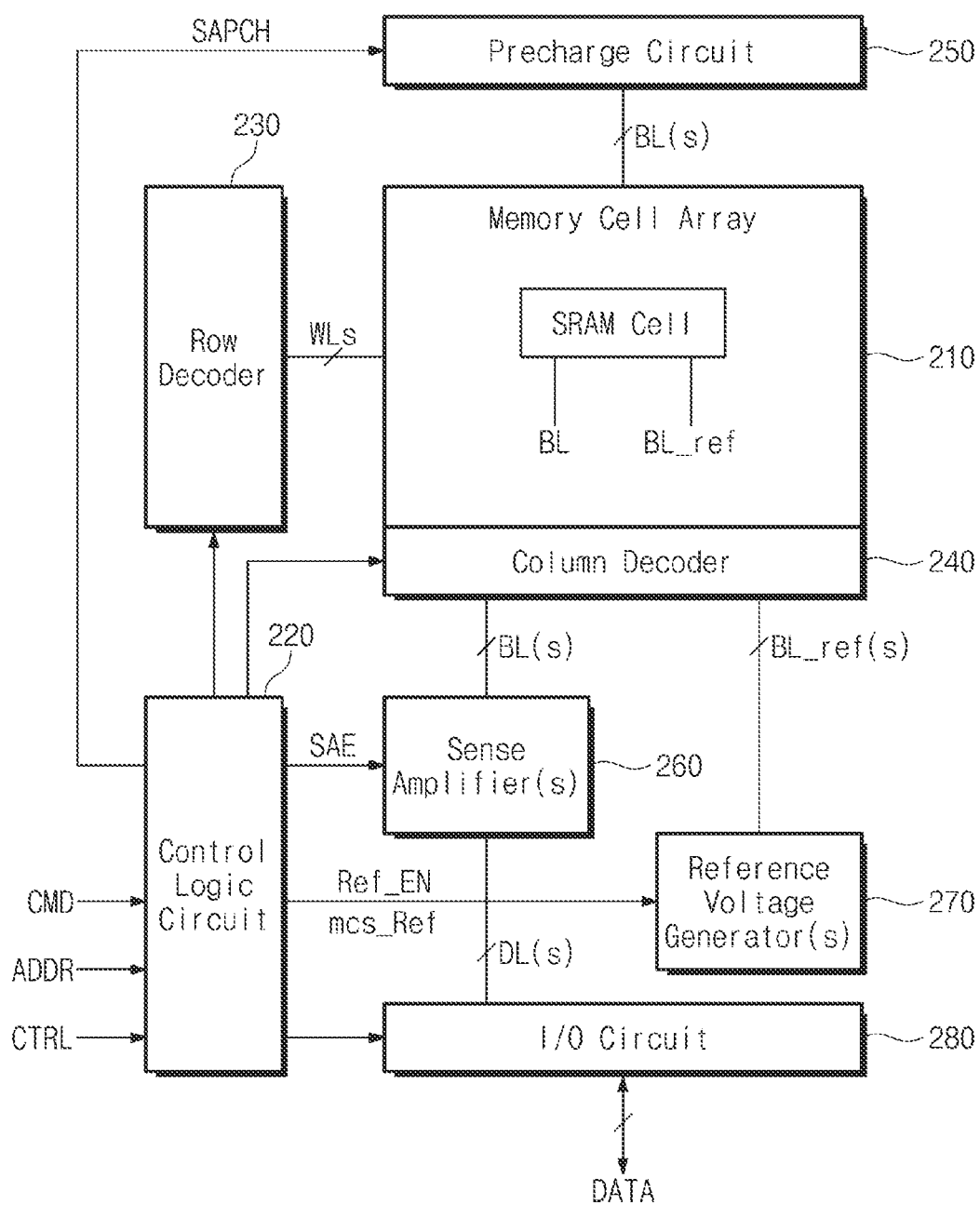
FIG. 17 is a diagram illustrating a configuration of a memory device according to an embodiment of the present disclosure.

FIG. 17 is a diagram illustrating a configuration of a memory device 200 according to an embodiment of the present disclosure.

The memory device 200 may include a memory cell array 210, a control logic circuit 220, a row decoder 230 (e.g., a decoder circuit), a column decoder 240 (e.g., column decoder circuit), a precharge circuit 250, a sense amplifier 260, a reference voltage generator 270, and an input/output circuit 280.

The memory cell array 210 may include memory cells arranged in a plurality of rows and a plurality of columns. A memory cell may be a static random access memory (SRAM) cell. The memory cells constituting the memory cell array 210 may be connected with word lines WL and bit lines BL, and each memory cell may be accessed through the word line WL and the bit line BL. Each memory cell may be connected with the reference bit line BL_ref. In the read operation, a voltage of the pre-charged bit line BL may change depending on data stored in the memory cell. The sense amplifier 260 may compare the reference voltage Vref of the reference bit line BL_ref and the voltage of the bit line BL and may determine a value of data stored in the memory cell.

The control logic circuit 220 may receive a command CMD, an address ADDR, and a control signal CTRL from the outside. The control logic circuit 220 may generate a row address and a column address based on at least one of the command CMD, the address ADDR, and the control signal CTRL. The control logic circuit 220 may provide the row address to the row decoder 230 and may provide the column address to the column decoder 240. To control the precharge circuit 250, the control logic circuit 220 may generate the sense amplifier precharge signal SAPCH, the reference voltage enable signal Ref_EN, and the trimming control signal mcs_Ref based on the control signal CTRL.

The row decoder 230 may decode the row address received from the control logic circuit 220 and may select a word line for accessing a memory cell. The column decoder 240 may decode the column address received from the control logic circuit 220 and may select a bit line for accessing a memory cell.

In response to the sense amplifier precharge signal SAPCH, the precharge circuit 250 may pre-charge the bit line BL and the reference bit line BL_ref or may equalize the bit line BL and the reference bit line BL_ref with the same voltage.

The sense amplifier 260 may sense data stored in the memory cell MC by sensing a voltage difference of the bit line BL and the reference bit line BL_ref. The sense amplifier 260 may output a sensing result as the signal SOUT. For example, the sense amplifier 260 of the present disclosure may be a latch-type sense amplifier.

The reference voltage generator 270 may generate a reference voltage for determining data stored in a memory cell. The reference voltage generator 270 may include a reference voltage generation circuit (e.g., 122) and a reference voltage trimming circuit (e.g., 124). The reference voltage generator 270 may be composed of PMOS transistors that are insensitive to a reference voltage distribution. Alternatively, the reference voltage generator 270 may be implemented with a combination of PMOS transistors and NMOS transistors so as to well track an NMOS transistor (e.g., MN3 of FIG. 3) of the sense amplifier 260, which is used to ground the bit line BL and the reference bit line BL_ref.

The input/output circuit 280 may receive data "DATA" to be stored in a memory cell from the outside or may receive data, which are read from the memory cell, from the sense amplifier 260 and may output the data "DATA" to the outside. The input/output circuit 280 may include a buffer or a memory for temporarily storing the write data and the read data. The input/output circuit 280 may include a serializer serializing data and a deserializer deserializing data.

Figure 18:
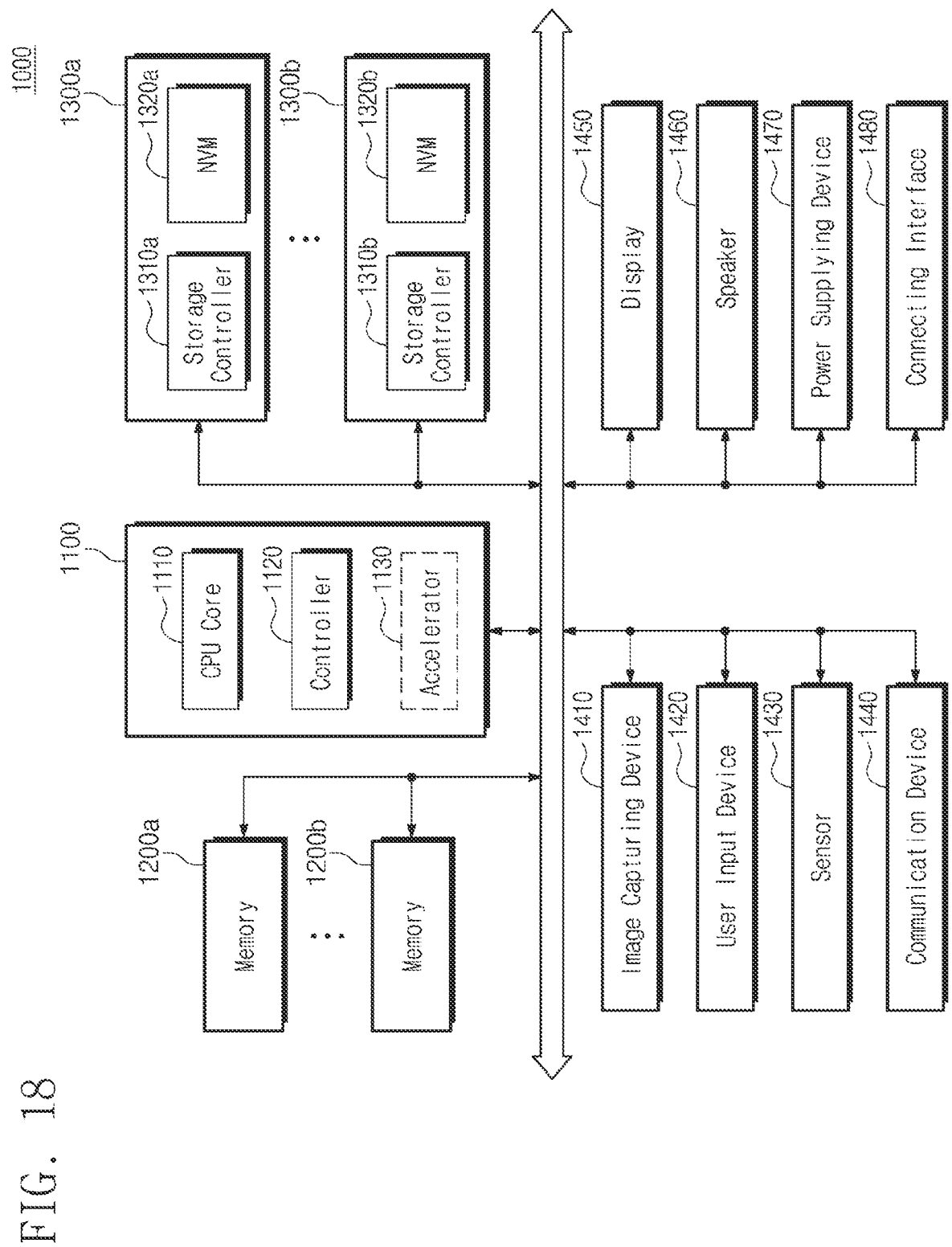
FIG. 18 is a diagram illustrating a system to which a memory device including an SRAM according to an embodiment of the present disclosure is applied.

FIG. 18 is a diagram of a system 1000 to which a storage device, which includes SRAM according to an embodiment, is applied. The system 1000 of FIG. 18 may be a mobile system, such as a portable communication terminal (e.g., a mobile phone), a smartphone, a tablet personal computer (PC), a wearable device, a healthcare device, or an Internet of things (JOT) device. However, the system 1000 of FIG. 1 is not necessarily limited to the mobile system and may be a PC, a laptop computer, a server, a media player, or an automotive device (e.g., a navigation device).

The system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) according to an embodiment and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100. For example, the SRAM may be implemented by the SRAM 100 of FIG. 1.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to embodiments of the present disclosure, an SRAM including a single bit line may provide a reference voltage generator capable of minimizing a width of a distribution of reference voltages. As such, an SRAM that operates stably may be provided.

According to embodiments of the present disclosure, an SRAM that operates even with a small voltage difference because a differential sense amplifier is provided that compares an output of a memory cell and an output of a reference voltage generator.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A static random access memory (SRAM) comprising:
    a memory cell configured to store data;
    a reference voltage generator comprising a reference voltage generation circuit configured to generate a reference voltage based on voltage division and a reference voltage trimming circuit configured to trim a value of the reference voltage;
    a precharge circuit connected with the memory cell through a bit line, connected with the reference voltage generator through a reference bit line, and configured to pre-charge the bit line and the reference bit line; and
    a sense amplifier connected with the bit line and the reference bit line, and configured to compare a voltage of the bit line and a voltage of the reference bit line and to determine a value of the data stored in the memory cell based on a result of the compare,
    wherein the reference voltage generation circuit comprises a first p-channel metal-oxide semiconductor (PMOS) transistor connected between a terminal providing a power supply voltage and a first node from which the reference voltage is output, and
    each of the reference voltage generation circuit and the reference voltage trimming circuit comprises another PMOS transistor connected to the first node and configured to operate in response to a same reference voltage enable signal.

2. The SRAM of claim 1, wherein the reference voltage generation circuit further comprises:
    a second PMOS transistor connected between the first node and a second node, and configured to operate in response to a reference voltage enable signal; and
    at least one third PMOS transistor connected between the second node and a terminal providing a ground voltage, and configured to operate in response to the first voltage.

3. The SRAM of claim 2, wherein the at least one third PMOS transistor comprises:
    PMOS transistors constituting a first string and connected in series between the second node and the terminal providing the ground voltage; and
    PMOS transistors constituting a second string and connected in series between the second node and the terminal providing the ground voltage.

4. The SRAM of claim 2, wherein the first voltage is a voltage for always turning on the first PMOS transistor and the at least one third PMOS transistor.

5. The SRAM of claim 2, wherein the reference voltage trimming circuit comprises:
    a fourth PMOS transistor including a first end connected with the first node, and configured to operate in response to the reference voltage enable signal; and
    at least one fifth PMOS transistors connected between a second end of the fourth PMOS transistor and the terminal providing the ground voltage, and configured to operate in response to a reference voltage trimming signal.

6. The SRAM of claim 1, wherein the precharge circuit comprises:
a first p-channel metal-oxide semiconductor (PMOS) transistor configured to transfer a power supply voltage to the bit line in response to a sense amplifier precharge signal;
a second PMOS transistor configured to transfer the power supply voltage to the reference bit line in response to the sense amplifier precharge signal; and
a third PMOS transistor configured to connect the bit line and the reference bit line in response to the sense amplifier precharge signal.

7. The SRAM of claim 1, wherein the sense amplifier comprises:
a first inverter including an output terminal connected with the bit line;
a second inverter including an output terminal connected with the reference bit line; and
an n-channel metal-oxide semiconductor NMOS (transistor) configured to discharge the output terminal of the first inverter and the output terminal of the second inverter in response to a sense amplifier enable signal,
wherein an input terminal of the first inverter is connected with the output terminal of the second inverter, and an input terminal of the second inverter is connected with the output terminal of the first inverter.

8. The SRAM of claim 1, further comprising:
a switching circuit,
wherein the switch circuit comprises:
a first switching transistor configured to connect the bit line with the precharge circuit in response to a sense amplifier enable signal; and
a second switching transistor configured to connect the reference bit line with the precharge circuit in response to the sense amplifier enable signal.

9. The SRAM of claim 1, wherein the reference voltage generator is a first reference voltage generator and the reference voltage is a first reference voltage,
wherein the SRAM further comprises:
a second reference voltage generator configured to generate a second reference voltage, and
wherein the first reference voltage and the second reference voltage are output to the reference bit line.

10. The SRAM of claim 1, wherein the sense amplifier comprises:
at least one first (n-channel metal-oxide semiconductor) NMOS transistor connected between the second node and the terminal providing the ground voltage and in parallel with the at least one third PMOS transistor, and configured to operate in response to a second voltage.

11. A static random access memory (SRAM) comprising:
a memory cell configured to store data;
a reference voltage generator configured to generate a reference voltage;
a precharge circuit connected with the memory cell through a bit line, connected with the reference voltage generator through a reference bit line, and configured to pre-charge the bit line and the reference bit line;
a sense amplifier connected with the bit line and the reference bit line, and configured to compare a voltage of the bit line and a voltage of the reference bit line and to determine a value of the data stored in the memory cell based on a result of the compare; and a switching circuit, wherein the switch circuit comprises a first switching transistor configured to connect the bit line between the precharge circuit and the memory cell in response to a sense amplifier enable signal, and a second switching transistor configured to connect the reference bit line between the precharge circuit and reference voltage generator in response to the sense amplifier enable signal,
wherein the reference voltage generator comprises:
a first p-channel metal-oxide semiconductor (PMOS) transistor connected between a terminal providing a power supply voltage and a first node from which the reference voltage is output, and configured to operate in response to a first voltage;
a second PMOS transistor connected between the first node and a second node, and configured to operate in response to a reference voltage enable signal; and
at least one n-channel metal-oxide semiconductor (NMOS) transistor connected between the second node and a terminal providing a ground voltage, and configured to operate in response to a second voltage.

12. The SRAM of claim 11, wherein
the at least one NMOS transistor comprises:
NMOS transistors constituting a first string and connected in series between the second node and the terminal providing the ground voltage; and
NMOS transistors constituting a second string and connected in series between the second node and the terminal providing the ground voltage.

13. The SRAM of claim 11, further comprising:
a third PMOS transistor including a first end connected with the first node, and configured to operate in response to the reference voltage enable signal; and
at least one fourth PMOS transistor connected between a second end of the third PMOS transistor and the terminal providing the ground voltage, and configured to operate in response to a reference voltage trimming signal.

14. The SRAM of claim 11, wherein the precharge circuit further comprises:
a third PMOS transistor configured to transfer a power supply voltage to the bit line in response to a sense amplifier precharge signal;
a fourth PMOS transistor configured to transfer the power supply voltage to the reference bit line in response to the sense amplifier precharge signal; and
a fifth PMOS transistor configured to connect the bit line and the reference bit line in response to the sense amplifier precharge signal.

15. The SRAM of claim 11, wherein the sense amplifier comprises:
a first inverter including an output terminal connected with the bit line;
a second inverter including an output terminal connected with the reference bit line; and
a switching transistor configured to discharge the output terminal of the first inverter and the output terminal of the second inverter in response to a sense amplifier enable signal,
wherein an input terminal of the first inverter is connected with the output terminal of the second inverter, and an input terminal of the second inverter is connected with the output terminal of the first inverter.

16. The SRAM of claim 15, wherein the switching transistor and the at least one NMOS transistors have an attribute of a slow cell.

17. A static random access memory (SRAM) comprising:

a memory cell configured to store data;

a reference voltage generator configured to generate a reference voltage;

a precharge circuit connected with the memory cell through a bit line, connected with the reference voltage generator through a reference bit line, and configured to pre-charge the bit line and the reference bit line; and a sense amplifier connected with the bit line and the reference bit line, and configured to compare a voltage of the bit line and a voltage of the reference bit line and to determine a value of the data stored in the memory cell based on a result of the compare, wherein the reference voltage generator comprises:

a first p-channel metal-oxide semiconductor (PMOS) transistor connected between a terminal providing a power supply voltage and a first node from which the reference voltage is output, and configured to operate in response to a first voltage;

a second PMOS transistor connected between the first node and a second node, and configured to operate in response to a reference voltage enable signal;

at least one third PMOS transistor connected between the second node and a terminal providing a ground voltage, and configured to operate in response to the first voltage; and at least one first (n-channel metal-oxide semiconductor) NMOS transistor connected between the second node and the terminal providing the ground voltage and in parallel with the at least one third PMOS transistor, and configured to operate in response to a second voltage.

18. The SRAM of claim 17, wherein the at least one third PMOS transistor includes PMOS transistors constituting a first string and connected in series between the second node and the terminal providing the ground voltage, and wherein the at least one first NMOS transistors include NMOS transistors constituting a second string and connected in series between the second node and the terminal providing the ground voltage.

19. The SRAM of claim 17, wherein the reference voltage generator further comprises:

a fourth PMOS transistor including a first end connected with the first node, and configured to operate in response to the reference voltage enable signal; and at least one fifth PMOS transistor connected between a second end of the fourth PMOS transistor and the terminal providing the ground voltage, and configured to operate in response to a reference voltage trimming signal.

20. The SRAM of claim 17, wherein the sense amplifier comprises:

a first inverter including an output terminal connected with the bit line;

a second inverter including an output terminal connected with the reference bit line; and a switching transistor configured to discharge the output terminal of the first inverter and the output terminal of the second inverter in response to a sense amplifier enable signal, wherein an input terminal of the first inverter is connected with the output terminal of the second inverter, and an input terminal of the second inverter is connected with the output terminal of the first inverter.

* * * * *